United States Patent
Manolarakis et al.

(10) Patent No.: US 10,616,782 B2
(45) Date of Patent: Apr. 7, 2020

(54) CROSS-CHANNEL USER TRACKING SYSTEMS, METHODS AND DEVICES

(71) Applicant: mGage, LLC, Atlanta, GA (US)

(72) Inventors: Christos Manolarakis, Brooklyn, NY (US); Mark Sutterlin, Maplewood, NJ (US); Andrew Milkowski, Guttenberg, NJ (US); Guowei Zhang, Syosset, NY (US); Stephanie Luxenberg, Brooklyn, NY (US); Rick Landsman, Cortlandt Manor, NY (US); Maurice J. Carron, San Francisco, CA (US)

(73) Assignee: mGage, LLC, Atlanta, GA (US)

( * ) Notice: Subject to any disclaimer, the term of this patent is extended or adjusted under 35 U.S.C. 154(b) by 0 days.

(21) Appl. No.: 13/843,710

(22) Filed: Mar. 15, 2013

(65) Prior Publication Data

US 2014/0120864 A1 May 1, 2014

Related U.S. Application Data

(60) Provisional application No. 61/617,357, filed on Mar. 29, 2012.

(51) Int. Cl.
*H04M 3/42* (2006.01)
*H04M 11/00* (2006.01)
(Continued)

(52) U.S. Cl.
CPC ........ *H04W 24/08* (2013.01); *G06Q 30/0251* (2013.01)

(58) Field of Classification Search
CPC ....... H04W 4/00; H04W 4/001; H04W 4/003; H04W 4/005
See application file for complete search history.

(56) References Cited

U.S. PATENT DOCUMENTS

| 5,559,562 A | 9/1996 | Ferster |
| 5,710,887 A | 1/1998 | Chelliah et al. |

(Continued)

FOREIGN PATENT DOCUMENTS

| EP | 1415691 | 6/2004 |
| EP | 2239700 | 10/2010 |

(Continued)

OTHER PUBLICATIONS

International Search Report and Written Opinion of the International Searching Authority for International Patent Application No. PCT/IB2013/001209 mailed from the ISA on Mar. 6, 2014 (8 pages).

(Continued)

*Primary Examiner* — San Htun
(74) *Attorney, Agent, or Firm* — Neugeboren O'Dowd PC

(57) ABSTRACT

In part, the invention relates to systems and methods suitable for operating a client side platform for deterministically correlating a unique mobile user across multiple marketing communication channels using a universal identifier to provide a deterministic mapping of individual channel user identifiers. In an embodiment, the invention relates to systems and methods suitable for operating a client side platform for probabilistically correlating a unique mobile user across multiple marketing communication channels to provide a mapping of individual channel user identifiers. The systems and methods can be used to identify user activity across different marketing communication channels accessed with a given mobile device.

20 Claims, 21 Drawing Sheets

(51) Int. Cl.
*H04W 24/08* (2009.01)
*G06Q 30/02* (2012.01)

(56) References Cited

U.S. PATENT DOCUMENTS

| | | | |
|---|---|---|---|
| 5,745,766 A | 4/1998 | Bramnick et al. | |
| 6,020,883 A | 2/2000 | Herz et al. | |
| 6,034,746 A | 3/2000 | Desai et al. | |
| 6,049,797 A | 4/2000 | Guha et al. | |
| 6,394,899 B1 | 5/2002 | Walker | |
| 6,567,854 B1 | 5/2003 | Olshansky et al. | |
| 6,578,199 B1 | 6/2003 | Tsou et al. | |
| 6,594,691 B1 | 7/2003 | McCollum et al. | |
| 6,614,808 B1 | 9/2003 | Gopalakrishna | |
| 6,621,866 B1 | 9/2003 | Florencio et al. | |
| 6,647,257 B2 | 11/2003 | Owensby | |
| 6,704,930 B1 | 3/2004 | Eldering et al. | |
| 6,736,322 B2 | 5/2004 | Gobburu et al. | |
| 6,757,735 B2 | 6/2004 | Apostolopulos et al. | |
| 6,766,956 B1 | 7/2004 | Boylan, III et al. | |
| 7,006,976 B2 | 2/2006 | Glatt | |
| 7,017,145 B2 | 3/2006 | Taylor | |
| 7,043,564 B1 | 5/2006 | Cook et al. | |
| 7,044,362 B2 | 5/2006 | Yu | |
| 7,047,209 B2 | 5/2006 | Filepp et al. | |
| 7,051,047 B2 | 5/2006 | Jung et al. | |
| 7,058,594 B2 | 6/2006 | Stewart | |
| 7,062,469 B2 | 6/2006 | Meyers et al. | |
| 7,089,576 B1 | 8/2006 | Lynch | |
| 7,089,579 B1 | 8/2006 | Mao et al. | |
| 7,096,488 B1 | 8/2006 | Zhang et al. | |
| 7,102,067 B2 | 9/2006 | Gang et al. | |
| 7,127,261 B2 | 10/2006 | Van Erlach | |
| 7,131,587 B2 | 11/2006 | He et al. | |
| 7,158,943 B2 | 1/2007 | van der Riet | |
| 7,203,684 B2 | 4/2007 | Carobus et al. | |
| 7,237,061 B1 | 6/2007 | Boic | |
| 7,240,036 B1 | 7/2007 | Mamdani et al. | |
| 7,251,478 B2 | 7/2007 | Cortegiano | |
| 7,269,636 B2 | 9/2007 | McCollum et al. | |
| 7,343,317 B2 | 3/2008 | Jokinen et al. | |
| 7,536,686 B2 | 5/2009 | Tan et al. | |
| 7,548,915 B2 | 6/2009 | Ramer et al. | |
| 7,555,284 B2 | 6/2009 | Yan et al. | |
| 7,583,733 B1 | 9/2009 | Zhang et al. | |
| 7,653,001 B2 | 1/2010 | Agrawal et al. | |
| 7,668,832 B2 | 2/2010 | Yeh et al. | |
| 7,680,796 B2 | 3/2010 | Yeh et al. | |
| 7,711,791 B2 | 5/2010 | DuVall et al. | |
| 7,739,594 B2 | 6/2010 | Vasilik | |
| 7,769,764 B2 | 8/2010 | Ramer et al. | |
| 7,783,721 B2 | 8/2010 | McCollum et al. | |
| 7,797,441 B1 | 9/2010 | Barnes et al. | |
| 7,818,741 B1 | 10/2010 | Bourdev | |
| 7,844,491 B1 | 11/2010 | Haitsuka et al. | |
| 7,992,165 B1 | 8/2011 | Ludewig et al. | |
| 8,099,316 B2 | 1/2012 | Moukas et al. | |
| 8,099,317 B2 | 1/2012 | Moukas et al. | |
| 8,099,318 B2 | 1/2012 | Moukas et al. | |
| 8,160,916 B2 | 4/2012 | Moukas et al. | |
| 8,218,651 B1 | 7/2012 | Eshet et al. | |
| 8,239,242 B2 | 8/2012 | Moukas et al. | |
| 8,424,036 B2 | 4/2013 | Haberman et al. | |
| 2002/0016961 A1 | 2/2002 | Goode | |
| 2002/0073034 A1 | 6/2002 | Wagner et al. | |
| 2002/0087976 A1 | 7/2002 | Kaplan et al. | |
| 2002/0111172 A1* | 8/2002 | DeWolf | G06Q 30/02 455/456.3 |
| 2002/0116474 A1 | 8/2002 | Copeland et al. | |
| 2002/0120498 A1 | 8/2002 | Gordon et al. | |
| 2002/0128908 A1 | 9/2002 | Levin et al. | |
| 2002/0178445 A1 | 11/2002 | Eldering et al. | |
| 2003/0004802 A1 | 1/2003 | Callegari | |
| 2003/0018966 A1 | 1/2003 | Cook et al. | |
| 2003/0023489 A1 | 1/2003 | McGuire | |
| 2003/0032409 A1 | 2/2003 | Hutcheson et al. | |
| 2003/0046201 A1 | 3/2003 | Cheyer | |
| 2003/0065558 A1 | 4/2003 | Shaw et al. | |
| 2003/0077559 A1 | 4/2003 | Braunberger et al. | |
| 2003/0093790 A1 | 5/2003 | Logan et al. | |
| 2003/0149618 A1 | 8/2003 | Sender et al. | |
| 2003/0195023 A1 | 10/2003 | Di Cesare | |
| 2003/0202468 A1 | 10/2003 | Cain et al. | |
| 2003/0208402 A1 | 11/2003 | Bibelnieks | |
| 2004/0054589 A1 | 3/2004 | Nicholas et al. | |
| 2004/0066759 A1 | 4/2004 | Molteni et al. | |
| 2004/0103024 A1 | 5/2004 | Patel et al. | |
| 2004/0122735 A1 | 6/2004 | Meshkin | |
| 2004/0122835 A1 | 6/2004 | McKibben et al. | |
| 2005/0015816 A1 | 1/2005 | Christafalo et al. | |
| 2005/0091682 A1 | 4/2005 | Czeck | |
| 2005/0114909 A1 | 5/2005 | Mercier | |
| 2005/0207442 A1 | 9/2005 | Zoest et al. | |
| 2005/0222989 A1 | 10/2005 | Haveliwala et al. | |
| 2005/0223316 A1 | 10/2005 | Veselov | |
| 2005/0226276 A1 | 10/2005 | Sanders et al. | |
| 2005/0246283 A1 | 11/2005 | Gwiazda et al. | |
| 2005/0283797 A1 | 12/2005 | Eldering et al. | |
| 2006/0015746 A1 | 1/2006 | Kusudo et al. | |
| 2006/0031892 A1 | 2/2006 | Cohen | |
| 2006/0059044 A1 | 3/2006 | Chan et al. | |
| 2006/0085816 A1 | 4/2006 | Funk et al. | |
| 2006/0248209 A1 | 11/2006 | Chiu et al. | |
| 2006/0287912 A1 | 12/2006 | Raghuvamshi | |
| 2007/0060099 A1 | 3/2007 | Ramer et al. | |
| 2007/0061336 A1 | 3/2007 | Ramer et al. | |
| 2007/0061363 A1 | 3/2007 | Ramer et al. | |
| 2007/0088801 A1 | 4/2007 | Levkovitz | |
| 2007/0088851 A1 | 4/2007 | Levkovitz | |
| 2007/0088852 A1 | 4/2007 | Levkovitz | |
| 2007/0094081 A1 | 4/2007 | Yruski et al. | |
| 2007/0143181 A1 | 6/2007 | Linkner et al. | |
| 2007/0174230 A1 | 7/2007 | Martin | |
| 2007/0198443 A1 | 8/2007 | Chernev et al. | |
| 2007/0234207 A1 | 10/2007 | Turakhia | |
| 2007/0244929 A1 | 10/2007 | Huang et al. | |
| 2007/0256095 A1 | 11/2007 | Collins | |
| 2007/0276726 A1 | 11/2007 | DiMatteo | |
| 2007/0283384 A1 | 12/2007 | Haeuser et al. | |
| 2007/0294096 A1 | 12/2007 | Randall et al. | |
| 2007/0294292 A1 | 12/2007 | Hydrie et al. | |
| 2007/0294423 A1 | 12/2007 | Brockenbrough et al. | |
| 2007/0294772 A1 | 12/2007 | Hydrie et al. | |
| 2007/0294773 A1 | 12/2007 | Hydrie et al. | |
| 2008/0040215 A1 | 2/2008 | Huang et al. | |
| 2008/0103952 A1 | 5/2008 | Flake et al. | |
| 2008/0103953 A1 | 5/2008 | Flake et al. | |
| 2008/0120364 A1 | 5/2008 | Chari et al. | |
| 2008/0147484 A1 | 6/2008 | Davis | |
| 2008/0189735 A1 | 8/2008 | Barton et al. | |
| 2008/0235722 A1 | 9/2008 | Baugher et al. | |
| 2008/0255944 A1* | 10/2008 | Shah | G06Q 30/02 705/14.47 |
| 2008/0300957 A1 | 12/2008 | Hirai et al. | |
| 2009/0003432 A1 | 1/2009 | Liu et al. | |
| 2009/0017805 A1* | 1/2009 | Sarukkai | H04W 28/06 455/414.3 |
| 2009/0031339 A1 | 1/2009 | Pickens et al. | |
| 2009/0083144 A1 | 3/2009 | Menditto et al. | |
| 2009/0094634 A1 | 4/2009 | Haberman et al. | |
| 2009/0094639 A1 | 4/2009 | Haberman et al. | |
| 2009/0132347 A1 | 5/2009 | Anderson et al. | |
| 2009/0138361 A1 | 5/2009 | Moukas et al. | |
| 2009/0138427 A1* | 5/2009 | Kalavade | 707/1 |
| 2009/0150926 A1 | 6/2009 | Schlack | |
| 2009/0199236 A1 | 8/2009 | Barrett et al. | |
| 2009/0234713 A1 | 9/2009 | Bi et al. | |
| 2009/0248680 A1 | 10/2009 | Kalavade | G06Q 30/0267 |
| 2009/0257435 A1 | 10/2009 | Karlsson et al. | |
| 2010/0015926 A1* | 1/2010 | Luff | 455/67.13 |
| 2010/0030692 A1 | 2/2010 | Turakhia | |
| 2010/0145762 A1 | 6/2010 | Coladonato et al. | |
| 2010/0161316 A1* | 6/2010 | Haug | 704/9 |
| 2010/0161506 A1* | 6/2010 | Bosenick et al. | 705/347 |

(56) References Cited

U.S. PATENT DOCUMENTS

| | | | |
|---|---|---|---|
| 2010/0228625 | A1 | 9/2010 | Priyadarshan et al. |
| 2011/0022473 | A1 | 1/2011 | Moukas et al. |
| 2011/0029380 | A1 | 2/2011 | Moukas et al. |
| 2011/0066488 | A1 | 3/2011 | Ludewig et al. |
| 2011/0093327 | A1* | 4/2011 | Fordyce, III ........... G06Q 20/10 705/14.39 |
| 2013/0067510 | A1 | 3/2013 | Ahanger et al. |

FOREIGN PATENT DOCUMENTS

| | | |
|---|---|---|
| JP | 11-265398 | 9/1999 |
| JP | 2002-351909 | 12/2002 |
| JP | 2003-091629 | 3/2003 |
| JP | 2006-179008 | 7/2006 |
| WO | 9926415 | 5/1999 |
| WO | 0145025 | 6/2001 |
| WO | 0245384 | 6/2002 |
| WO | 2006 084114 | 8/2006 |
| WO | 2011046667 | 4/2011 |

OTHER PUBLICATIONS

Salesforce.com Delivers the AppExchange and Winter '06, heralding the arrival of the Business Web. PR Newswire. Jan. 17, 2006 (3 pages).

Neff, Jack. Enterprise software targets a new frontier: Marketing. Food Processing, 62:4, Apr. 2001 (6 pages).

Harland Works Direct Marketing Magic with Campaign Wizard: Online Development Service Helps Financial Institutions Create Direct Marketing Campaigns. PR Newswire, Feb. 21, 2003 (3 pages).

Giving Brokers Marketing assistance: Wholesalers are helping their mortgage broker clients gain customers of their own by providing then with on-line help to creat marketing materials. Broker Magazine, 8:3, Apr. 2006 (4 pages).

Flytxt Revolutionizes Mobile Direct Marketing. Business Wire. Oct. 10, 2006 (5 pages).

Mobasher, "Data Mining for Web Personalization", The Adaptive Web. LNCS 5321, pp. 90-135 (2007).

Power, D.J., "A Brief History of Decision Support Systems", DSSResources.COM, World Wide Web, http://OSSResources.COM/history/dsshistory.html, version 4.0, Mar. 10, 2007 (13 pages).

JDK 5.0 New I/O-related APIs & Developer Guides—Documentation, Sun Microsystems 2004 (30 pages).

QuickTime File format, Apple Computer, Inc., Mar. 1, 2001 (274 pages).

QuickTime Overview, Apple Computer, Inc., Aug. 11, 2005 (34 pages).

David Singer and Mohammed Zubair Visharam, "MPEG-4 File Formats", Nice, Oct. 2005 (5 pages).

Rob Koenen, editor, MPEG-4 Overview (v. 21—Jeju Version), Mar. 2002 (78 pages).

ISO/IEC 14496-12, "Information technology-Coding of Audio Visual objects, Part 12: ISO base media file format", second edition Apr. 1, 2005, corrected version Oct. 1, 2005 (94 pages).

How to Write Advertisements that Sell, author unknown, from System, the magazine of Nusiness, dated 1912, downloaded from http://library.duke.edu/digitalcollections/eaa_Q0050/ on Feb. 21, 2015 (45 pages).

Plain old telephone service, from Wikipedia, downloaded Mar. 19, 2015 from http://en.wikipedia.org/wiki/Plain_old_telephone_service (3 pages).

Graphical user interface, from Wikipedia, downloaded Mar. 19, 2015 from http://en.wikipedia.org/wiki/Graphical_user_interface (12 pages).

*TNS Media Research, LLC et al.* v. *TIVO Research and Analytics, Inc.*, 11 Civ. 4039, Feb. 22, 2016, downloaded Feb. 23, 2016 from http://www.law360.com/dockets/download/56cb8011a1717c59000000c3?doc_url=https%3A%2F%2Fecf.nysd.uscourts.gov%2Fdoc1%2F127117684825&label=Case+Filing (40 pages).

Schulzrinne, H. et al., RFC 2326, Apr. 1998, Real Time Streaming Protocol (RTSP) (Apr. 1998) (92 pages).

Schulzrinne, H. et al., RFC 3550, Jul. 2003, RTP: A Transport Orotocol for Real-Time Applications (Jul. 2003) (81 pages).

Call for bids, from Wikipedia, dowloaded from https://en.wikipedia.org/wiki/Call_for_bids on Jul. 1, 2015 (3 pages).

Consular reports: Commerce, manufactures, etc., Issues 164-167. United States. Bureau of foreign Commerce, United States. Dept. of Commerce and Labor G.P.O., 1894, p. 361.

International Search Report for PCT/US2012/049334 mailed Nov. 19, 2012 (4 pages).

\* cited by examiner

Multi Channel Tracking Coverage

1 Channel: 14,448

2 Channels: 1,893

3 Channels: 981

4 Channels: 109

Figure 7F

CROSS-CHANNEL USER TRACKING SYSTEMS, METHODS AND DEVICES

CROSS-REFERENCE TO RELATED APPLICATIONS

This application claims priority to U.S. Provisional Patent Application Ser. No. 61/617,357 filed Mar. 29, 2012, the entire disclosure of which is incorporated by reference herein.

BACKGROUND

User tracking is a prominent trend in online media. The ability to track and uniquely identify users is important for a wide range of marketing strategies. It is therefore expanding rapidly from the online to the mobile world. User interactions with mobile devices, along with the consumption of mobile services, can relay significant information about a user's behavior and their demographics. Understanding the user becomes equally important to the role and the utility of those services with regard to discovering user insights and intents. That intelligence is critical for prediction and optimization of marketing campaigns and their creative performance.

Mobile marketing efforts usually include various vendor products and services, along with 3rd party technologies and services to achieve campaign reach, frequency and conversion objectives. Achieving such objectives often requires use of a mix of marketing communication channels. Mobile user tracking is normally isolated with regard to individual products or individual marketing channels. As a result, tracking individual users across channels is not easily achieved.

Conversion is a standard metric used to measure the success of marketing campaigns, which can be based on the attrition of users that fail to proceed to each touch point on the way to completion of an actual user action. Examples of conversion events may include a file download by the user, a completion of a user registration form, or a purchase of products or services. Determining when a user clicks on an ad, watches it, and then whether or not the user takes action with respect to the ad is challenging. Evaluating conversion is further complicated by the wide ranges of activities, interactions and channels a user can undertake.

Mobile ad servers log impression delivery when ad tags are transmitted to a publisher's content server. A more desirable approach is to count impressions after actual presentation of the marketing messages to end users. Most mobile SSI systems have no way of determining whether an ad was delivered to the device and played to completion. The result is discrepancies in impression counting. Another example of the problem occurs when users navigate to new content before an ad creative has completely rendered. The result is impressions reported as delivered, even though not seen which can be a basis for advertiser payment concerns.

As a result, a need therefore exists for analysis and reporting tools to inform their allocation decisions. A need also exists to address issues relating to user tracking across different channels and to improve conversion and track return on investment. The embodiments of the invention address this need and others.

SUMMARY

In one aspect, the invention relates to systems, methods, non-transitory machine readable media, devices and systems configured to correlate user activities such as interactions with messages and other content across multiple mobile marketing channels. In one embodiment, one or more software-based methods are implemented on the client side of the network such as within a client device such as a mobile device to facilitate cross-channel user tracking. One embodiment of the invention relates to end to end cross channel user tracking which includes tracking unique users across multiple delivery channels, across multiple campaigns and within a given campaign.

One embodiment includes a client side approach for deterministically correlating a unique mobile user across multiple marketing communication channels. A universal identifier provides a deterministic mapping of individual channel user identifiers to each other by uniquely mapping each of them to a single unique universal user identifier assigned to an individual channel user's device. This allows that user to be identified across marketing communication channels accessed with their device. In one embodiment, a universal identifier provides a probabilistic mapping of individual channel user identifiers to each other by uniquely mapping each of them to that single unique universal user identifier assigned to their device. Combinations of user tracker using a universal identifier and both deterministic and probabilistic mapping methods are also embodiments of the invention.

In one embodiment, channel specific user identifiers, such as EIDs, are saved in device persistent memory, along with a generated universal ID, such as a VID, that is mapped to each channel's user identifier. Cross channel user correlation can be accomplished by embedding requests for remote programs in content and advertisements consumed by users on their mobile device. External programs are retrieved from remote servers when content is rendered by device resident applications. These programs incorporate software modules and computing devices that capture individual channel user identifiers as the user navigates across media distribution channels.

In one embodiment, the term federated refers to usage of a universal identifier that is generated by the federation of unique (non-universal) identifiers collected from the same user. The storage of user information with regard to multiple channels under a single identifier can be referred to as federation because it federates identifiers for the user across channels, apps, emails, messages, etc.

New channel correlations can be transmitted to a remote server application as the user accesses each channel for the first time. These correlations allow server side federation of the user information associated with each channel's user identifier, maintained by the delivery channel itself. In one embodiment, additional federation with 3rd party online and offline data sources can optionally be used to generate user profiles that include a superset of each channel's identifying information, merged with additional $3^{rd}$ party information for that same user. Analysis of that expanded data set can be used to generate enhanced psychographic, demographic and lifestyle segmented user profiles.

In one aspect, the invention relates to methods of user tracking across channels suitable for evaluating the success of a given mobile campaign or activity. In one embodiment, tracking features suitable for evaluating which ads have the highest activity levels, user interest for a website, the number of returning visitors, or other conversion metrics are another embodiment of the invention. Software and system tools to correlate the impressions and clicks associated with mobile web site user events and engagements are another embodiment of the invention. In addition, software-based user interfaces and reporting tools suitable for managing multichannel advertising budget allocations and to measure accurate, channel-specific return on investment are other embodiments of the invention.

In one embodiment, a computer-based method of tracking a user across a plurality of communication channels may include generating a first non-universal user identifier associated with a first communication channel in response to a first action of a mobile device. The method may further include generating a second non-universal user identifier associated with a second communication channel in response to a second action of the mobile device. The method may also include storing the first non-universal user identifier and the second non-universal user identifier in a data repository. The method may additionally include correlating, using an application installed on the mobile device, the stored first non-universal user identifier and the stored second non-universal user identifier with a universal identifier having an associated user profile. Moreover, the method may include associating the universal identifier with a plurality of actions performed with the mobile device such that the associated user profile comprises a mapping between the universal identifier and activities performed by the user across the plurality of communication channels.

In an implementation, the method may include generating a third non-universal user identifier associated with a third communication channel in response to a third action of the mobile device. The first, second, and third communication channels may be selected from the group consisting of receiving text messages, receiving emails, viewing a video, viewing a webpage, viewing a video ad, viewing a webpage ad, interacting with social applications, and downloading an application. The profile may be generated using approximation methods including clustering and probabilistic matching using a plurality of mobile device channel specific identifiers. Associating the universal identifier with a plurality of actions may be performed using a computing device running a Bayseian Network to perform probabilistic user matching. Additionally, the method may include comparing one or more user profiles to incoming request profiles using a probabilistic Bayesian network running on computing device.

In one embodiment, a computer-based system of tracking a user across a plurality of communication channels may include one or more receivers, executing on a computing device. The one or more receivers may be configured to collect the information from the plurality of communication channels. The system may further include an event ID generator configured to provide non-universal user identifiers that can be matched to a universal user identifier. The system may also include a data repository comprising a plurality of non-universal user identifiers. Each non-universal user identifier may be associated with one communication channel of the plurality of communication channels. The system may additionally include a federation server configured to receive user actions associated with each communication channel from a mobile device client application. The federation server may be configured to generate a universal identifier using the received user actions and the plurality of non-universal user identifiers.

In an implementation, the system may include a compact uniform resource locator (URL) software module configured to compact a mobile web URL accessed by the mobile device and generate a non-universal user identifier associated with the compacted mobile URL. The communication channels may be selected from the group consisting of receiving text messages, receiving emails, viewing a video, viewing a webpage, viewing a video ad, viewing a webpage ad, and downloading an application. The system may further include a privacy software module configured to enable the user to opt out of being tracked using a universal identifier. The system may additionally include a privacy software module.

In one embodiment, a computer program product residing on a computer readable storage medium may have a plurality of instructions stored thereon, which, when executed by a processor, may cause the processor to perform operations for tracking a user across a plurality of communication channels. The operations may include generating a first non-universal user identifier associated with a first communication channel in response to a first action of a mobile device. The operations may further include generating a second non-universal user identifier associated with a second communication channel in response to a second action of the mobile device. The operations may also include storing the first non-universal user identifier and the second non-universal user identifier in a data repository. The operations may additionally include correlating, using an application installed on the mobile device, the stored first non-universal user identifier and the stored second non-universal user identifier with a universal identifier having an associated user profile. Moreover, the operations may include associating the universal identifier with a plurality of actions performed with the mobile device such that the associated user profile comprises a mapping between the universal identifier and activities performed by the user across the plurality of communication channels.

In an implementation the operations may further include generating a third non-universal user identifier associated with a third communication channel in response to a third action of the mobile device. The first, second, and third communication channels may be selected from the group consisting of receiving text messages, receiving emails, viewing a video, viewing a webpage, viewing a video ad, viewing a webpage ad, interacting with social applications, and downloading an application. The profile may be generated using approximation methods including clustering and probabilistic matching using a plurality of mobile device channel specific identifiers. The mobile device channel specific identifiers may be selected from the group consisting of a first party cookie, a third party cookie, and a plurality of product identifiers. Associating the universal identifier with a plurality of actions may be performed using a computing device running a Bayesian Network to perform probabilistic user matching. The operations may further include comparing one or more user profiles to incoming request profiles using a probabilistic Bayesian network running on computing device.

BRIEF DESCRIPTION OF DRAWINGS

The figures are not necessarily to scale, emphasis instead generally being placed upon illustrative principles. The figures are to be considered illustrative in all aspects and are not intended to limit the invention, the scope of which is defined only by the claims.

FIGS. 7A to 7F are a screen shot and representations of user tracking or advertising information of interest that can be displayed as part of an automatically generated report or user interface in accordance with an illustrative embodiment of the invention.

DETAILED DESCRIPTION

In one aspect, the invention relates to systems and methods for tracking user interactions such as the interactions of a mobile device user with respect to a plurality of communication channels. Mobile Internet advertising includes streaming graphic or video files, in real time, into content as it is rendered at a user's mobile device. Those image or text marketing communication messages are inserted into the content at the publisher's content management system. Selection of a specific ad and its insertion occurs prior to returning the user requested content over a carrier's network. Images and texts are just a few of the many types of communication channels a user can interact with and receive ads and content through.

Figure 1A:
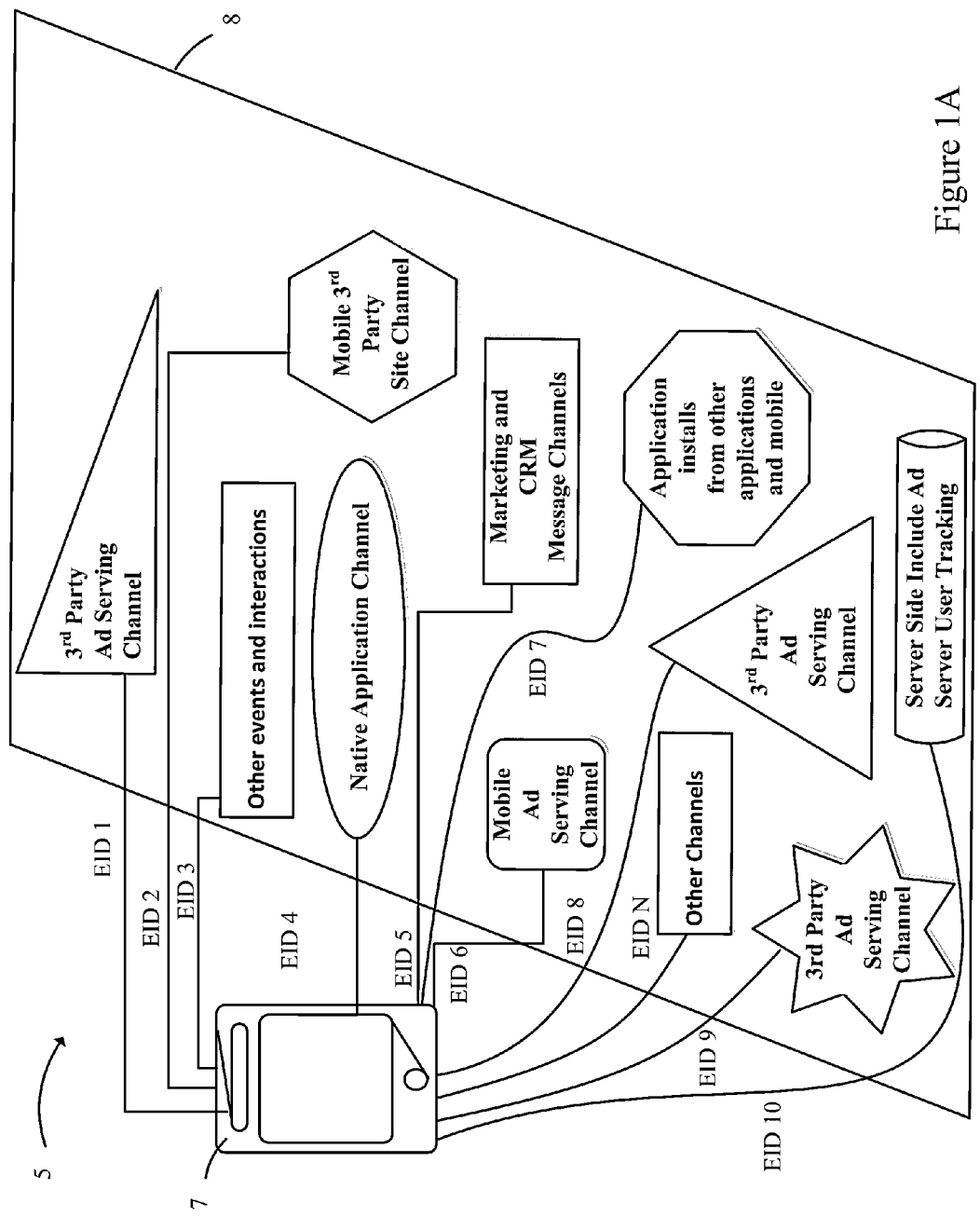
FIG. 1A is a schematic diagram of a system of cross-channel user and event tracking in accordance with an illustrative embodiment of the invention.

FIG. 1A shows an exemplary cross-channel tracking system 5 suitable for use with a user of a mobile device 7. As shown, various communication channels 8 are typically accessed via the mobile device 7. With respect to a given communication channel such as for example, a 3rd Party Ad Serving Channel, Application installs from other applications and mobile, 3rd Party Ad Serving Channel, Marketing and CRM Message Channels, 3rd Party Ad Serving Channel, Mobile 3rd Party Site Channel, Mobile Ad Serving Channel, Server Side Include Ad Server User Tracking, Native Application Channel, other events and interactions, and other channels, a non-universal identifier corresponding to a user identifier or an event identifier ("EID") can be generated in response to a user action with the mobile device 7. These EIDs can be stored with a user profile using a computing device in one embodiment.

Figure 1B:
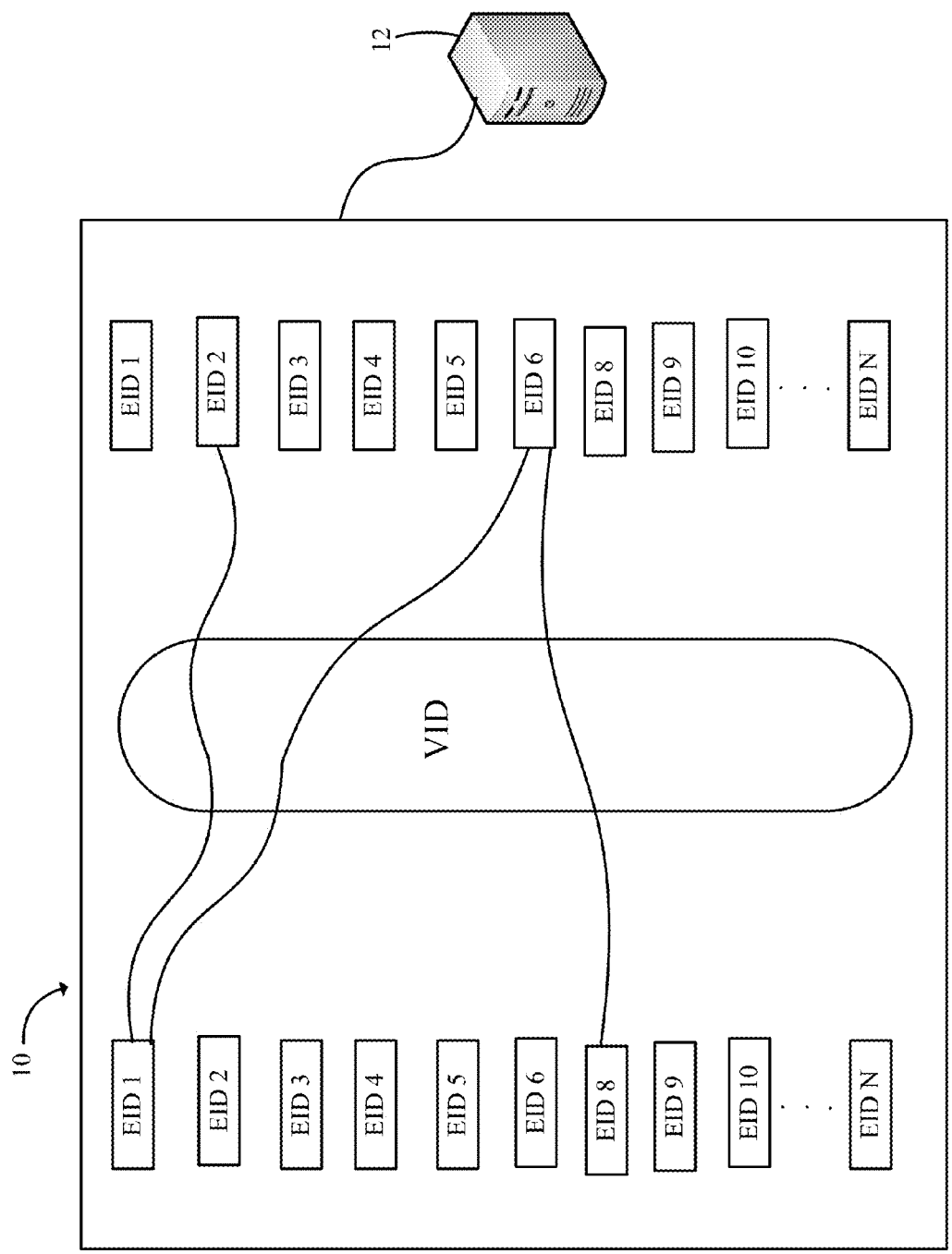
FIG. 1B is a schematic diagram of a mapping between a plurality of non-universal identifiers and a universal identifier implemented on a computing device to facilitate cross-channel user and event tracking and reporting in accordance with an illustrative embodiment of the invention.

As shown in FIG. 1A, for each of the various mobile device communication channels with respect which the mobile device 7 can interact, a non-universal user or event identifier EID is generated such as EID 1 to EID N. In contrast, the user is unique. As a result, a unique universal user identifier or VID can be associated with each mobile device as shown in the software-based identifier mapping 10. As shown, a computing device 12 can be connected to a network to receive tracking information associated with each EID and associated that with a VID. In one embodiment, computing device 12 stores or runs a matching engine to match or map EIDs and a VID on a per mobile device basis. In turn, on a per EID basis, each EID can be mapped to the VID. Further, from that mapping, implemented using a computing device, of EID 1 to VID, and EID 2 to VID, all the way through EID N to VID, each EID can then also be mapped to another EID as shown in FIG. 1B. Specifically, as shown, EID 1 and EID 8 are mapped to the VID for mobile device 7 from FIG. 1 and the VID is also mapped to by EID 6 and EID 2. Typically, each EID would map to the VID. In this way, the paths from one EID to another such as from EID 1 to EID 6 and from EID 2 to EID 1, and from EID 8 to EID 6 can be generated. These paths allow useful demographic and profiling information to be generated for a given user of mobile device 7.

In one embodiment, a user accesses a mobile device application, such as an iPhone application, and through an SDK, the entity providing the SDK collects an SDK specific identifier which can be an event identifier such as EID 1. That is a unique identifier, but since the apps are sandboxed this identifier is considered non-universal. It is not universal in the sense that absent more it typically cannot extend to other apps (e.g. web browser) for identification purposes. That said, this approach allows the entity providing the SDK, or a client application to confirm or probabilistically confirm that the entity is getting interactions from the same user.

As another example, when a user accesses a mobile browser, when an ad is served, a cookie is written. Specifically, the cookie is written to the user's browser. This cookie is yet another identifier unique to the user, which can be EID 6 for example, but such an identifier is non-universal. In one embodiment, the invention relates to generating a profile data store for identified users across applications of other mobile interactions. As shown in FIG. 1B, EID 6 and EID 1 and thus a mobile browser event and an SDK event can be associated with a particular mobile device user and a VID. The profile data store collects user profiles or the unique identifiers or EIDs. In one embodiment, the profile data store also enhances such EIDs with other possible attributes e.g. location, behavioral etc.

The respective information in each product channel during federation, in an embodiment of the invention, flows to a common server side profiling data store. A matching process, in some cases using approximation techniques, can be used to identify users across channels where correlation in the client is not possible, for example non-JavaScript enabled mobile devices. The consolidated result is assigned to a universal user identifier, VID. Additionally, a VID can be requested by, or transmitted at the time of correlation, to each product channel data store as a mapping to its associated federated user profile.

Current mobile advertising systems employ what is referred to as server side include ad ("SSI") serving. The publisher's content management system requests an advertisement over the broadband internet from an ad server, which selects a specific campaign ad and returns associated ad tag markup to the requesting publisher's system.

Insertions of the ad markup at the publisher's content management system is accomplished using a technique called server side include, tags or SSI tags. This technique refers to using variable values that a server can include in a content file before it sends it to a requesting user. When the content management system encounters those SSI placeholders embedded in the page, the server will obtain the value associated with the variable name and insert it before the content is sent to requesters. The server searches content templates for environment variables and runs associated software to insert variable information in the places in the page where "include" statements were embedded.

Figure 1C:
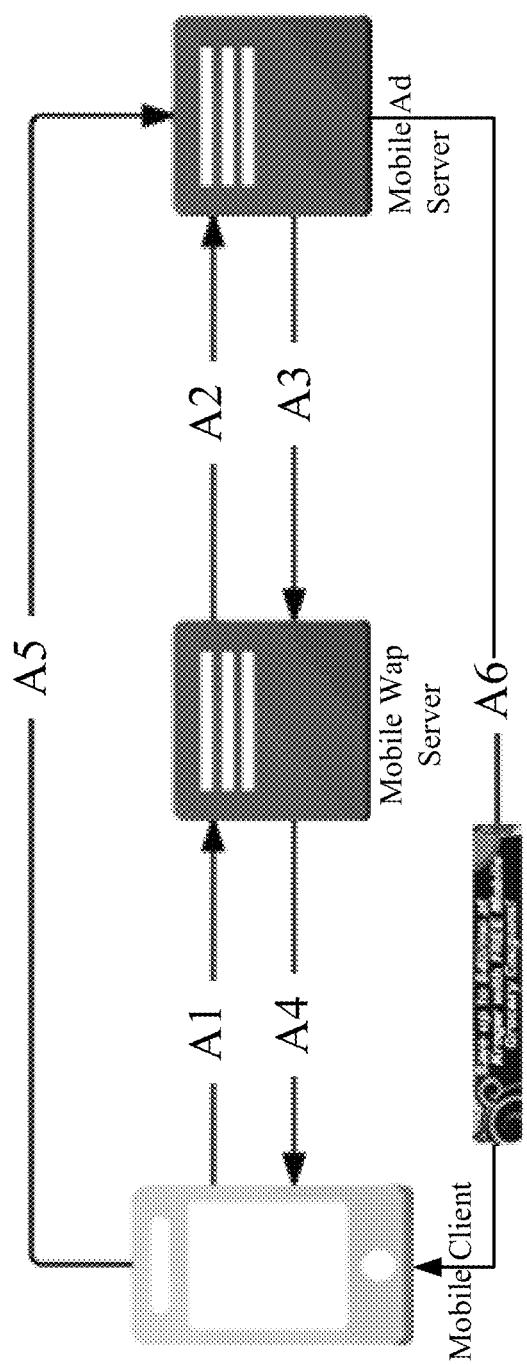
FIG. 1C is a schematic diagram of an example mobile server side include advertising system, in accordance with an illustrative embodiment of the invention.

In the case of mobile server side include advertising; a software package is provided to a publisher that performs communications with an advertising server, step A1, A2 and A3 in FIG. 1C. The software is often called a convenience ad request package and supplied in a variety of programming languages specific to publisher systems. This communication results in the return of ad markup tags specifying a particular ad or content. The ad or content is retrieved when the ad markup tag is rendered by the device, directly from the server hosting the ad or content, steps A4, A5 and A6. The ad markup tag can also define an address of a landing page to redirect a user's browser to when the ad is clicked.

Deficiencies inherent in server side systems including mobile advertising systems have inhibited use of mobile advertising in general. Small publishers often cannot afford the SSI scaling costs, in conjunction with the complexity required to integrate with multiple ad vendors. This is required just to obtain inventory fill rates that fully monetize their content. The added requirement publishers pay for additional bandwidth in order to interface to multiple ad sources, before they can insert ads and transmit the content to the user is not scalable across millions of simultaneous users accessing publisher servers.

Client device generated ad requests and counting mechanisms are necessary to accurately distribute revenue across multiple parties, as well as for delivery auditing; long the standard in traditional advertising. Upon receipt of advertising markup tags by a content management system over the broadband internet, the tags are inserted into the content replacing the server side include ad placement variables. This occurs prior to transmission of the content to the end user device.

Mobile SSI ad server user tracking advantageously uses ad servers to provide a mechanism to track users by associating them with a unique 3rd party cookie value maintained in the ad server database. This cookie value can be passed by the publisher using a convenience ad request package for storage in the device browser. The advantage of this convenience package pass through cookie is set as a 1st party cookie in the publisher domain, rather than a 3rd party cookie from the ad server domain. This occurs as a result of the convenience package running on the publisher domain content servers. Such cookies provide one basis to obtain EIDs with respect to a given mobile device and the particular channel using such cookies. The results EIDS can be mapped to a VID using one or more computing devices as outlined herein.

In online and mobile ad serving, 3rd party cookies are often blocked by default configurations in most device browsers. Translation of 3rd party ad server cookies to 1st party cookies through a convenience package allows anonymous user profiling to determine unique visits as well as frequency capping the number of times an ad is presented to each individual. During subsequent ad requests, that 1st party cookie is transparently transmitted to the ad server through the convenience package with the ad request, converting it back to the 3rd party ad server cookie unique to individual devices. Similarly, the convenience package passes protocol information, e.g., HTTP headers, allowing carrier and device targeting data to also be passed to the ad server.

User call to action conversions can be tracked when a user clicks on an ad, via additional markup anchor tags inserted at the publisher content management system alongside the ad request itself. These conversions can be used to generate EIDs. This performs a subsequent request to the ad server, encoding a mapping to a destination address for a landing page associated with the relevant ad or content. This mapping is configured for a specific campaign in the campaign management system. The server records a click through for a user when it receives that request.

After recording a click through, the server redirects the user's browser to the actual landing page previously configured for the campaign. Additional markup code in that subsequent landing page, for example, such as transparent tracking pixel requests, can be embedded to track user's arrival at specific landing pages. The markup can also then track their navigation through additional pages of a brand's site. The result is a fine granularity of conversion analytics and segmentation for targeting users and generating EIDs.

Native application ad serving works similar to online Web based advertising, as opposed to mobile web SSI advertising, can also be modified to support tracking and thus EID generation. The selection of an ad is made in real time when the client device application requests an advertisement. Requests from the native application are communicated to an ad server directly. Thus, in one embodiment, no convenience package is used. This makes a decision on which ad source to serve an ad from at the time of the request.

Mobile application advertisements are typically presented to users in a view within the application itself, commonly called a Web View, rather than the device Internet browser. A native application on mobile devices has its execution environment. This environment securely sandboxed from the browser and other applications preserves privacy and restricts unauthorized information access.

User information can be transmitted in parallel with the client ad request in appropriate HTTP protocol headers, or embedded in the ad server request URL. Since native applications have access to hardware, retrieval of the device ID serial number, or its unique wireless radio MAC address, obviates the need for cookie support. Those attributes are usually encrypted such as hashing one way, such that direct personally identifiable information ("PII") is not transmitted outside the device.

The actual ad or content is then returned in a format the mobile application can decode, e.g., XML templates, while also containing the address of each media file to retrieve from a creative server. Once the application or its advertising SDK has retrieved all the media components that make up the ad, the advertising experience will be presented to the user at the appropriate time as designated by the application developer. User interaction information and redirection of the user to a conversion landing view can be transmitted to the ad server as appropriate. This can be used to generate EIDs specific to native applications such as EID 4 of FIG. 1A.

Mobile marketing activities can include a rich set of interactions that enable users to engage with a campaign. In almost all cases a call to action is required to transfer a user from the advertising activity that aims to inform the users about the interaction to an actual target destination. The uniquely identified information often depends on a registration channel with respect to which the user provides "Opt in" user identifying information. Additionally, the MSISDN unique user telephone identifier can be automatically captured by the SMS and MMS system, or an email address in the case of IP Messaging. The user is usually assigned a system generated identifier representing user identifying information without transmitting that PII data.

Client side user engagement tracking within a mobile site can be implemented including a JavaScript file request incorporated in pages of the site or its advertising. In this way, the JavaScript allows user tracking which allows an EID to be mapped to a VIA. When a visitor views the content, suitable JavaScript markup language or code renders and downloads an external JavaScript file containing software or instructions, such as JavaScript, for tracking a user's interaction with site content. This software or instructions make real time requests to tracking servers to record page views and content interaction events.

The JavaScript code can also gather information about the device execution environment and send that information to a tracking server with the HTTP requests from the visitor's browser. The document object model ("DOM") of a content page contains various browser and system information, such as the browser's version and the screen resolution that can be captured and sent. Additionally, requests can contain locations a visitor came from, their Internet address and automatic changes in their time zone as updated by a mobile carrier's network.

Mobile marketing companies employ a portfolio of products supporting the creation and execution of mobile marketing and advertising campaigns. These companies provide mostly managed services, but some are pursuing the development of self-service end to end platforms that agencies and brands ultimately manage themselves. Each point solution traditionally has its own mechanisms to track and retrieve information about individual users, e.g., cookies that could be stored in user's devices and retrieved at a later time. This user information could then be used to support new campaign activities, business intelligence operations or more detailed reporting.

End to end user tracking across channels is important to capture and offer the value that comes from user level specific information in the advertising industry and others. Incoming requests instantiated by a users' device can take any form ranging from mobile web sites to, applications, SMS, video and rich media and social networks response channels. Using a universal JavaScript tracking solution is one mechanism for user and device recognition. As a result, JavaScript based tracking is also an important approach for mapping EIDs to a VID.

There are cases where cookie ingestion is not possible. For example, user devices may block cookies or a cookie may fail to be retrieved during the session or user interaction is such that cookie cannot be enabled. In these cases, in addition to the EID's generation service, an additional computational method within a matching engine is responsible for identifying resemblance to recent, known user signal collected.

Figures 1, 2:
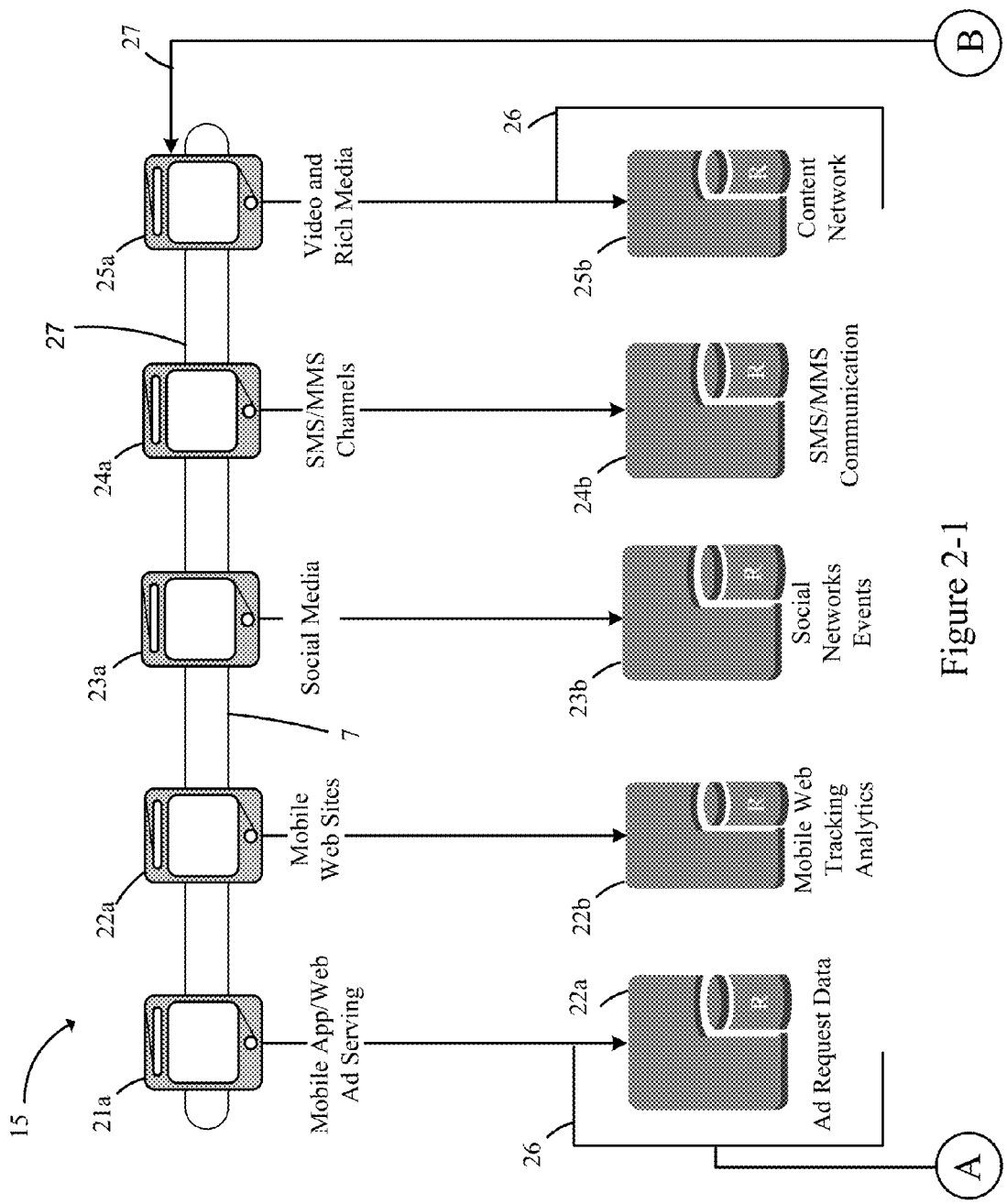
FIG. 2, which is split into FIGS. 2-1 and 2-2 along connectors A and B respectively, is a schematic diagram of a system of cross-channel tracking with respect to several communication channels.
Figure 2:
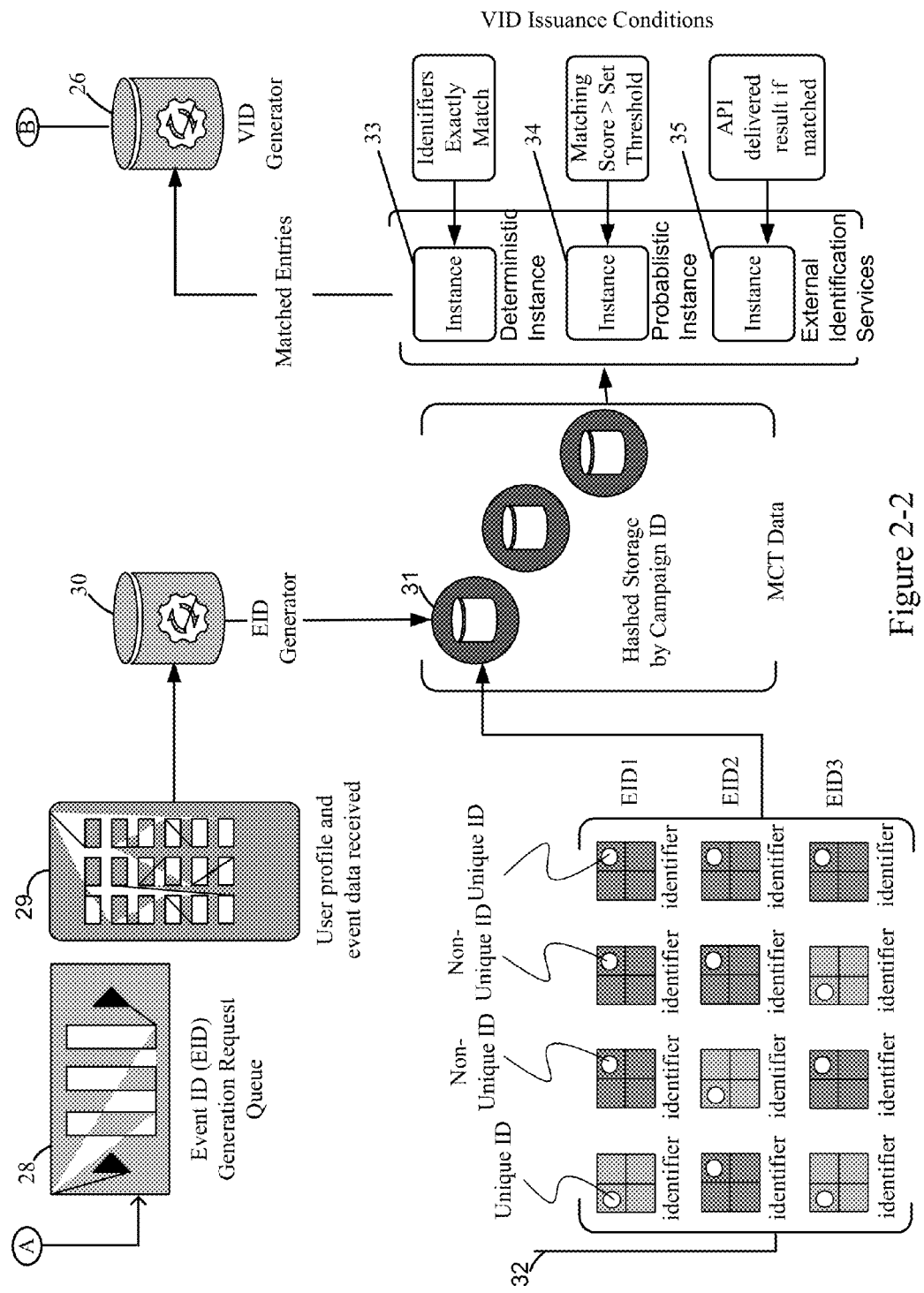

In part, the invention relates to end to end user tracking across marketing communication channels that enables federating unique information for each user across channel specific data stores the user interacts with. This is based on existing unique channel user identifiers, labeled EID ([user] Event ID) as shown in FIGS. 1A-1C and 2. In FIG. 2, a system 15 for cross-channel user tracking is depicted. A representative example of an ad server channel 21a, a marketing suite of SMS 24a or IP messaging channels 25a, a CRM system containing registration pages for segmenting users by communities of interests 23a, as well as an analytics channel 22a, represents graphically how this is accomplished in one embodiment as shown in FIG. 2.

Effective data strategies are predicated on gaining as close to a complete understanding of a user as possible, via the aggregation of a large and diverse set of anonymous user-level data. The system 15 and transfer steps shown in FIG. 2 can be used to aggregate, organize, and normalize data points across a centralized database of unique users. It can be integrated into ad servers to understand why an ad was served to begin with for example and to analyze outcomes. Campaign optimization is derived from an ability to align data, inventory and creative; with greater alignment leading to greater campaign and creative performance.

The integrated application of the methods described in order to uniquely correlate and identify user attributes coming from a set mobile marketing communication channels is shown in FIG. 2. The universal tracking mechanisms 27 employed in each channel (21a, 22a, 23a, 24a, and 25a) are sending the collected information to the "receiver" layer or receiver 26.

The receiver layer 26 includes collected user events (signals) from all possible product channels into a persistence layer 26. Each user event tuple of collected attributes is funneled through the receiver layer 26 to the Event ID generation queue 28 that is responsible to issue an EID. That is the event identifier and also a unique id for the corresponding tuple that upon matching is replaced by the universally assigned VID. The queuing service 28 collects and processes the requests. In one embodiment, the service 28 processes the requests on a first in first out basis. In an embodiment, this processing occurs substantially in real time.

The released rows from the queue are pushed to temporary data store 29 that upon EID assignment by the EID generator 30 pushes the corresponding rows to the multi-channel tracking data store 31. The MCT data store 31 based on the campaign id of each incoming row segregates the collected events by campaign in respect of permissions management and privacy constraints (if any).

The MCT Data store 31 also algorithmically obfuscates information that can be considered PII through hashing. A typical representation of the information residing in the corresponding data stores 32 is shown. Each tuple of collected user event and profile attributes, such as the list of boxes in the bottom left portion of FIG. 2-2, is identified by an EID. With respect to data store 32, as shown by the placement of the dots in the identifier grid, a dot in the upper left represents a unique identifier and a dot in the upper right box of a tuple represents a non-unique identifier. The user related tuples can contain both unique and non-unique identifiers based on the event or activity of the user. The unique identifier allow for deterministic matching 33 and immediate association of the corresponding EIDs with a universal identifier. In cases that the latter is not technically possible, (such as when rows include non-unique identifiers), a non-deterministic approach such as a probabilistic approach is used. For example, approximation techniques using thresholds to make probabilistic matching between a device and a channel are shown with regard to probabilistic matching instance 34 can be used. Entries with EIDs that meet the set threshold criteria are updated with a VID identifier as well. In general, if matching occurs, a VID is generated or matched to the EID.

Programmatic extensions that allow integration with $3^{rd}$ party identification services 35 are implemented in one embodiment. There are cases that integration with $3^{rd}$ party identification services allows the collection of an additional identifier for specific user events. This identifier is a key or character sequence that is mapped to $3^{rd}$ party identification service datastores. Upon matching the identified user is getting a VID that allows the user to be identified universally.

In all of the cases described above the VID generator 26 upon assignment of the VID to the matching tuples pushes the identifier to the corresponding universal tracking modules 27. The latter allows recurrent real time identification of the user in any subsequent request.

In part, one embodiment of the invention is configured to be independent from the ability of the device or network to uniquely identify the user. In addition, it is configured such that in those cases where unique identification is possible, the process remains the same having only the respective VID carrying more information. Finally, the data store of the user with the VID can be immediately used as a reference store for demographic or behavioral targeting and other audience profiling activities.

End to End User Tracking Server Application and Profile Federation Service

A site analytics event logging mechanism and application is implemented using a server. It is used to aggregate user tracking correlation data from individual users for storage in a server user profiling database. The individual channel identifiers, EIDs, mapped to a unique VID can be stored as foreign keys into the respective product channel databases and their user information.

Figures 1, 3:
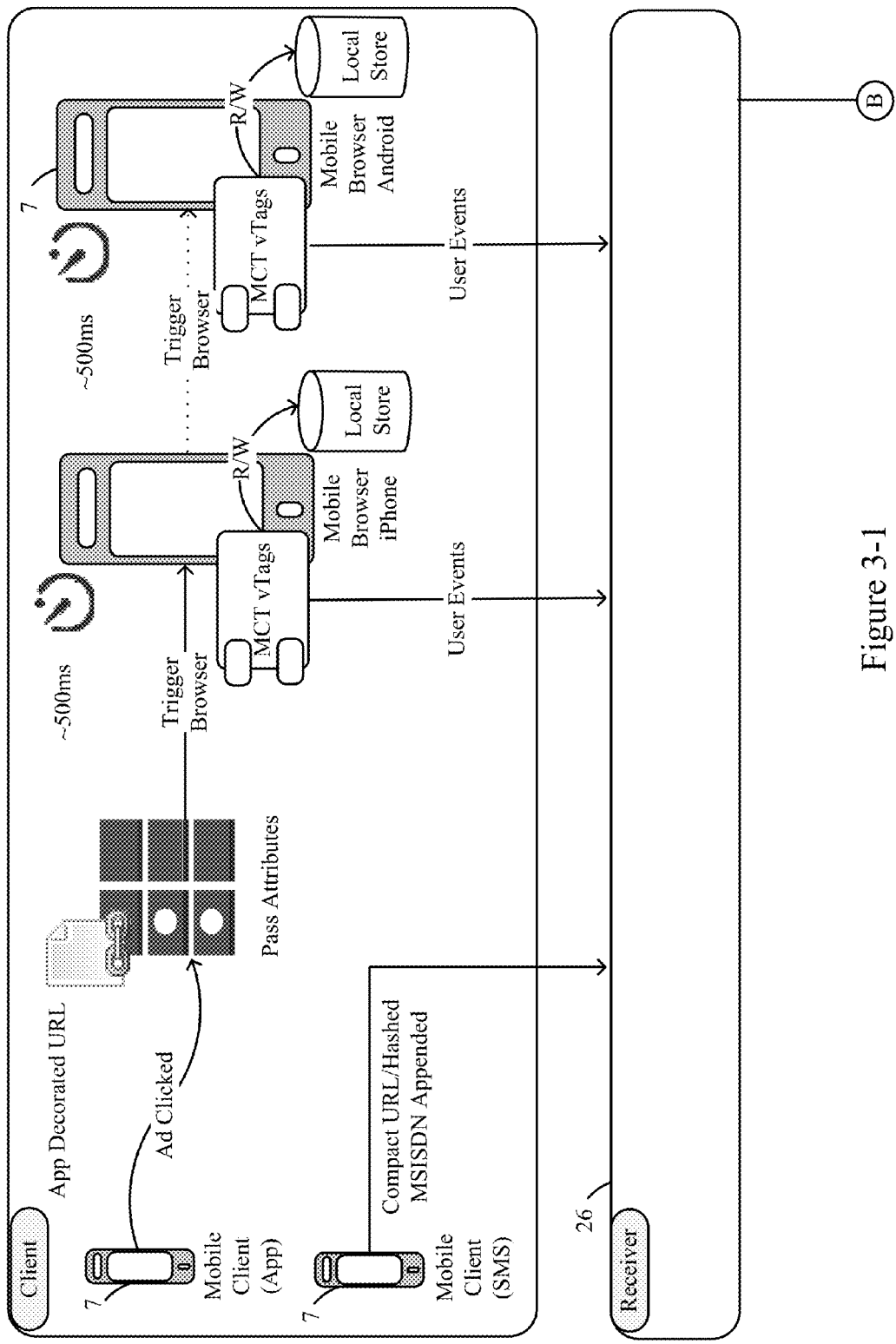
FIG. 3, which is split into FIGS. 3-1 and 3-2 along connectors A and B respectively, is a schematic diagram of a system of cross-channel tracking with respect to several communication channels.
Figures 2, 3:
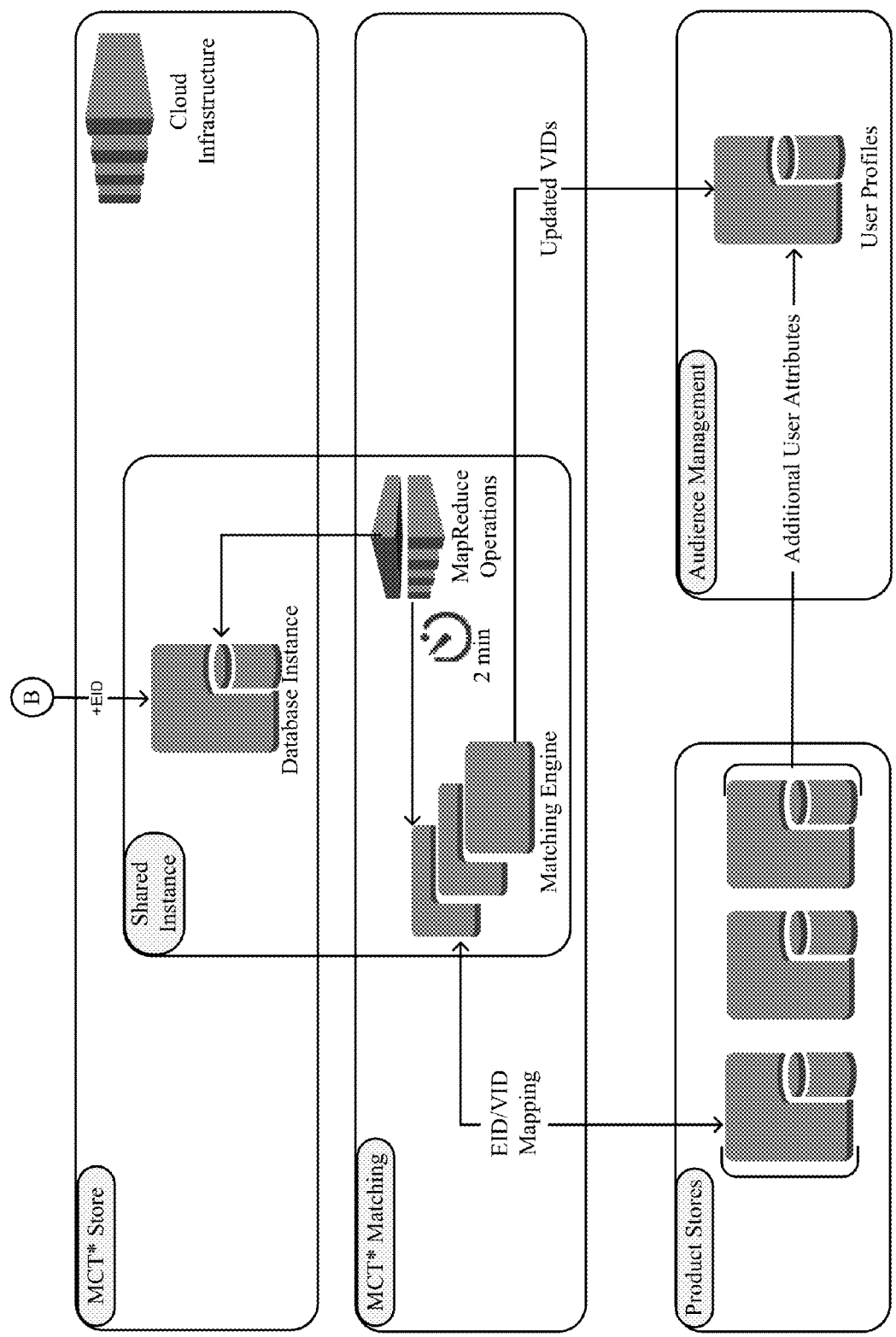

APIs are provided to allow products to request the VID for their EID, which can then be used to query additional targeting and optimization information from the data warehouse for any of the other product channels associated with the VID. The following functionality is provided by the user profiling system shown in the accompanying FIG. 3 (FIGS. 3-1 and 3-2). FIG. 3-1 shows the client side—the flow of information from the mobile device. As shown, several mobile devices are operating with respect to one or more campaigns or otherwise simply being used by their users. When an ad is clicked on device 7, the app decorated URL indicates that the click through URL is enhanced with the application ID. This also causes attributes to be passed and for a browser start up to be triggered on device 7. User events are sent to the receiver 26 also known as the receiver layer. The MCT v Tags are the JavaScript components used to capture events. These tags are read/written into a local data store as shown. In general, from clicking on an ad to getting it takes about 500 ms. Each of the elements in FIG. 3 can be implemented as a software module or software layer.

As shown in FIG. 3-2, the EID from the receiver is transmitted to the multi-channel tracking data store which can be implemented using a cloud based infrastructure. A database at the MCT datastore that includes the EIDs receives information from MapReduce Operations which also sends data to the matching engine. The MCT matching software performs EID/VID mapping and updates existing VID with new EID mappings thereto. The product store provides tracking information for a particular channel. The participants in a campaign or mobile device users in general form an audience. The audience management software updates user profiles with additional user attributes from the product stores.

One embodiment for cross channel user tracking creates a "Universal User Identifier" or VID that is persistent across product, across channel, and across campaigns. Binding federation of individual channels' user information, associated with the channel user ID, along with 3rd party data enables targetable unique user profiles.

A client side agent is created and used to collect and send events in order to support the mapping of individual channel IDs (EID) to the same universal user ID, for each device. The client side agent can be implemented using the Universal User Tracking JavaScript approaches described herein, user interaction logging with mobile content is performed on the server-side, in standard log files of the ad server.

Scripts executed inside a client device are an extensible way of logging user interaction with rich media advertising and mobile site content. In an embodiment, user client side tracking across channels is accomplished by inserting script tags in the content or advertisement.

Another embodiment of the invention automatically incorporates user tracking by configuration, e.g., in ad or landing page authoring tools. In cases where this is not possible, for example manually authored sites, minimal integration of the agent script tags in content pages provides for tracking and reporting user interaction in manually contained channels as well.

Advantages of using client side scripting to perform cross channel user correlations are outlined as follows. In depth conversion reporting that goes down to the user level, across campaigns is generated. Counting is activated when content is presented in the actual device, not when it is requested by the publisher's content management system. If content is cached, it will not be counted by servers. Cached content accounts for up to one-third of all views. Not counting cached content seriously skews many metrics. It is for this reason server-based log analysis is not considered suitable for analysis of human activity on websites and is not usually used in online ad serving today.

In one embodiment, updates performed by the JavaScript tracking agent, using HTTP requests, can be classified into two types. The first type includes agents that track page views. The second includes agents that track content object user interaction events. Each type is submitted to corresponding endpoints of the receiver of the events 26. in a server application for reporting.

In one embodiment, the universal scripted agent incorporates functionality to store User ID mappings between the VID and the various product channel User IDs as they are accessed by that user. These are stored in a client side HTML 5 database or another database. Additionally, the JavaScript agent incorporates end-to-end user tracking event logging to appropriate analytic server applications, using standard HTTP requests.

For a given mobile device, cookies are traditionally used to track visitors within campaigns. Specifically, 3rd party cookies can identify a visitor uniquely invoking the JavaScript agent, while a campaign cookie could be used to identify campaigns that user has participated in, resulting in cross campaign tracking. In the case of smart mobile devices, HTML 5 cross domain page messaging allows writing and reading first party cookies by the agent from inside the device. This is accomplished in cooperation with the publisher content page containing the script tags. As a result, circumventing 3rd party cookie restrictions is made possible.

Additionally, in this embodiment, a VID cookie can be written from the agent inside the device, which can be read by components in the same domain as the script server. This allows passing of the VID directly to an ad server. This allows the VID to correlate at the time of ad request its own channel user ID cookie previously set. This provides real time targeting of the universal cookie by ad servers, using information federated from other channels.

Server side probability mechanisms can correlate signals as a result of user actions across channels. Users often follow conversion paths from an ad or other content that cannot be fully tracked. As a result, the issuance of a VID by using exact correlation techniques is not possible. In these cases, approximation algorithms are used to provide estimates about the correlation of collected identifiers. Once a specific threshold (pre-set or automatically defined) is exceeded, the qualified user events are assigned a VID that updates the corresponding product channels. Feature phones, usually lacking local browser accessible persistent storage, can use a matching process, using approximation techniques, to identify users across channels where correlation in the client is not possible. For example, probabilistic Bayesian Networks can compare existing user profiles served previously against incoming request profiles.

Collecting protocol headers and their values, identifiers and attributes, along with browser internally detectable attributes can determine if a channel profile matches a profile previously seen. If not, that incoming profile is saved in the user profile database as a new user.

Association of Individual Channel User Identifiers with a VID

A VID, persisted within the client device as a result of an external JavaScript, can accomplish deterministic cross channel user correlation inside mobile devices. The individual product channel user tracking identifiers are associated with that VID, when a user accesses each type of channel for the first time.

One objective of user tracking end to end across marketing distribution channels is to provide solutions that enable the exchange and leverage of user information across all point products employed, across all campaigns. A universal identifier to uniquely identify individual user device interactions is one embodiment of the invention. This VID can be correlated with individual product user IDs, such as EIDs, for each channel as a user accesses them.

Identifying attributes captured during the interactions may include the MSISDN telephone number for SMS and MMS messaging products, Email addresses for CRM channels, Application IDs for native applications, mobile web browser cookies, as well as Network Operator information. Each of the foregoing is assigned a hash number and subsequently grouped and mapped to the universal ID assigned to that user. One way hashing of any personally identifying information ensures obfuscation of all PII information, without compromising the user unique identifiers, such as their MSISDN telephone number.

Users can be segmented into groups using federated data from the individual products as well as 3rd party information sources. These segments can then be used for premium targeting, as well as enhanced analytics using data sources such as Nielsen's PRISM segments.

In one embodiment, smart mobile devices configure to use HTMLs or higher are used to track users. A probabilistic implementation for cases in which deterministic matching is not possible, is also an embodiment as described herein. Some advantages of cross channel correlation in smart mobile devices include:

In general, the embodiments described herein are applicable to other existing and new marketing channels as well including social media. One embodiment of the invention relates to correlating representative channel identifiers with a universal user identifier enabling cross channel tracking.

Having already established an operational framework that enable products to exchange information about their status, execution requests, and anything related to configuration and execution of the marketing campaigns, this framework could be leveraged for real-time bidding using automated advertising exchanges. Additionally, cross-product active operational collaboration will enhance the overall user experience, e.g., personalization through behavioral targeting, and also enrich conversion tracking capabilities.

Each time a user is detected accessing a new product channel, the unique user identifier specific to that channel is stored in a client side database, e.g., a HTML 5 database, correlating that channel with the universal user ID, as well as all other channels that user has accessed. Special events via a receiver (listener layer) are logged to a server user profiling application using analytic event tracking facilities. Additional information regarding the user's device environment is also logged to a given software application embodiment.

Figure 4:
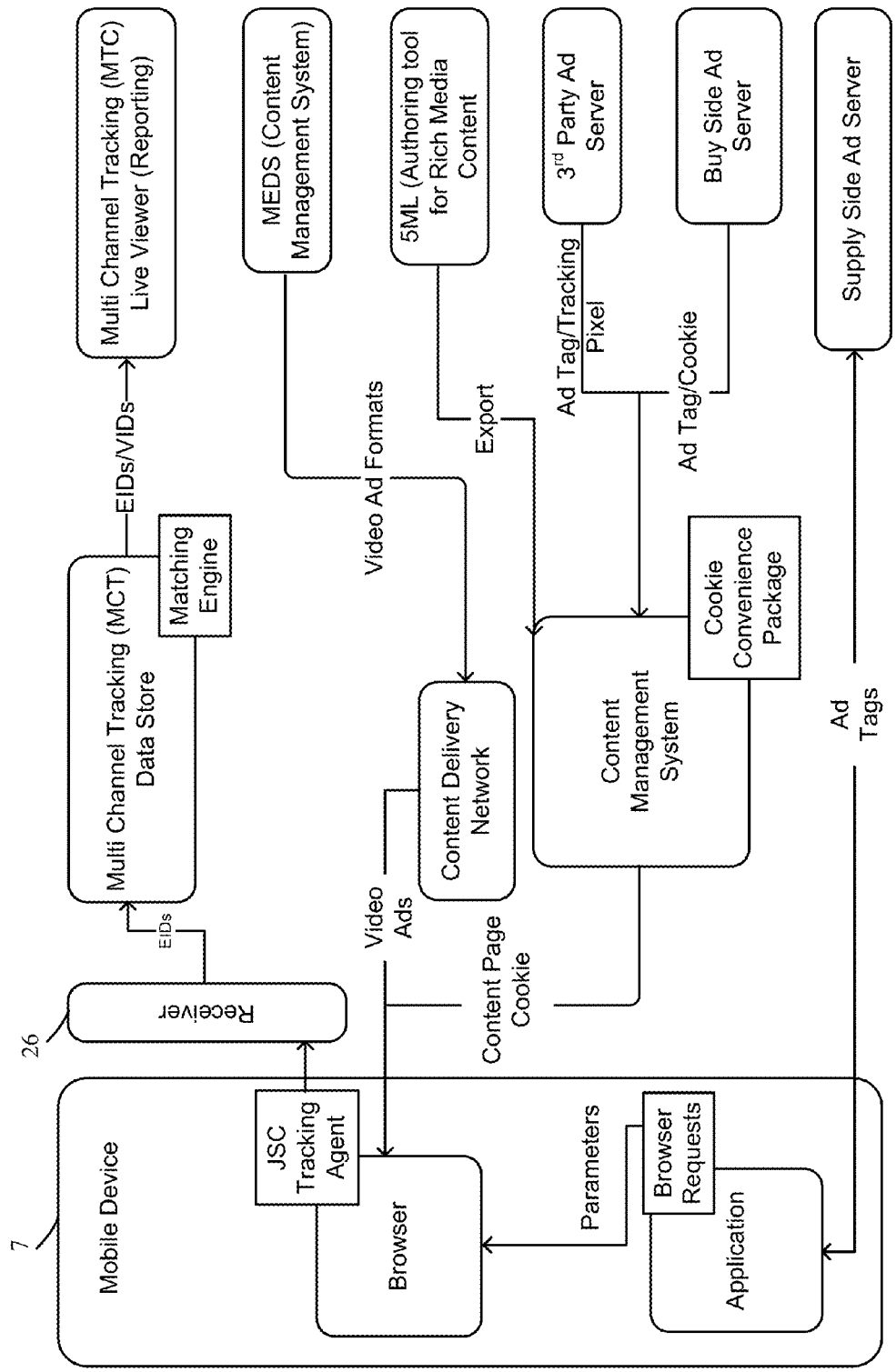
FIG. 4 is a schematic diagram of a system and one or more components used to perform cross correlation of the various distribution channels in accordance with an illustrative embodiment of the invention.

FIG. 4 shows a system and some components used to perform cross correlation of the various distribution channels. It should be referred to, along with the previous descriptions of each component, during the subsequent descriptions for cross channel correlation for HTML 5 iOS and Android smart devices. This implementation makes possible the use of a universal JavaScript to read 1st and third party cookies set by the components that make up a marketing and advertising platform. One non-limiting example of such a platform is Velti's mGage platform.

Correlating a Mobile Ad Serving Channel to a Universal User ID

Mobile Ad Severs normally support three ways to uniquely identify and store user information. A user ID provided by the operator, 1st party cookies stored in user's devices, and session identification. These options can be used interchangeably and in combination, given certain conditions apply.

Operator Provided Anonymous User Identifier

In cases where the mobile advertising server is white listed by a carrier, or an operator supports it unconditionally; it is possible to capture unique identifications assigned by the network to a user's device, upon device registration. Operators that support the provision of the particular information may in some cases alter unique identifiers for users, e.g., by rotation of identifiers across multiple users. In that case it is harder, if not impossible, to uniquely identify users. In such cases, one of the other methods may apply as a means to circumvent the issue.

1st Party Cookie

The Ad server creates a unique identifier with two goals, the first of which is to track repeated unique visits for frequency capping. The second is to use this information for a user tracking cookie stored in devices. The ad server convenience package, executed on a publisher's content management system, can be used to pass an ad server cookie to the device.

The convenience package is responsible for translating the ad server 3rd party domain cookie to a publisher's 1st party domain cookie. Otherwise that cookie would be a 3rd party cookie in a different domain and is often blocked at the browser. It is responsible for translating back the cookie for repeat visits, as well as pass header information describing the device type and carrier.

Correlating a 3rd Party Ad Serving Channel to a Universal ID

In cases that 3rd party ad serving is present, that is an ad server ad tags are delivered from another vendors ad server, unique user identification may not be applicable at all if cookies are disabled or disallowed. The Ad Server can be used to uniquely track impressions and their click through, but identification of the user requires using a cookie mechanism to ingest a cookie to a user's device upon cookie delivery. That requires that 3rd party cookies are enabled by the browser configuration.

One embodiment circumvents this situation by including the "Universal JavaScript URL" in tandem with the actual ad request when inserted into third party ad server campaigns. It is common practice to traffic multiple graphic requests as a compound ad tag using transparent tracking pixels for example. In a preferred embodiment, the Universal JavaScript request serves the same purpose a tracking pixel would, but delivers the ability to perform the same capabilities as discussed herein.

Correlating a Mobile 3rd Party Site Channel to a Universal ID

In the case of 3rd party mobile sites, there is no existing technology currently that enables user identification. A method is often implemented by connecting to a 3rd party site analytics product. That product captures information about the overall performance of the site and its user interaction objects, but would include enhancements to identify unique users as explained previously under the "Universal User Tracking JavaScript" description.

Correlating Native Application Channels to a Universal ID

The following approach describes the steps to determine that a user on a device, installing and interacting with any number of iOS or Android applications, is the same user accessing the mobile web through the device browser. It makes use of a special Internet address called a custom URL. That URL is a unique and persistent Internet address for invoking a specific native application installed on the device. It is normally used for clicking on links in pages rendered in browser to invoke the application.

For user tracking purposes, custom URLs will be used in a different manner, by appending it as part of the query string of a browser ad request URL. That URL is used to present a new ad format in a browser window, rather than the native application itself. It essentially provides a call back mechanism to the requesting application when the browser ad is terminated by the user or the ad itself. When the ad request URL is invoked by the application, it will cause an HTML 5 content ad to be requested from an ad server and returned to the browser window for rendering. The same approach can be applied for these cases where the user clicks on an ad link served within the native application.

Embedded in that content is a site analytics event tracking JavaScript. Enhancements are added to that script that allow the custom URL to be retrieved from the browser address field and stored in the browser HTML 5 local database. The VID delivered with the JavaScript file is also maintained in that database. This mechanism provides a fully correlated unique mapping of a Native Application ID and device ID to the universal ID for that user. Lastly, the custom URL is invoked when the ad completes or the user closes the ad, using it to return to the native application at the same point prior to the browser ad event. The steps executed are:

Correlation of Third Party Ad Serving Channel to a VID

The serving of ad tags from third party ad servers into a 3rd party hosted site using a hosted creative or tracking pixel, can make use of the previously explained approach to track a user. In this scenario, the previously described JavaScript is trafficked the same way a tracking pixel is, in parallel with any other trafficked ad tags.

Correlation of Marketing and CRM Message Channels to a Universal ID

By embedding the universal end to end user tracking JavaScript in any hosted mobile site or landing page, the individual product channel specific user identifiers can be captured and saved in the client side database of any HTML 5 smart device. The channel specific user ID is passed to the JavaScript executing in the page, encoded in the Internet browser address field. That ID is usually contained in the query string, and is usually hashed to be unique, encrypting any personally identifying data.

Figure 5:
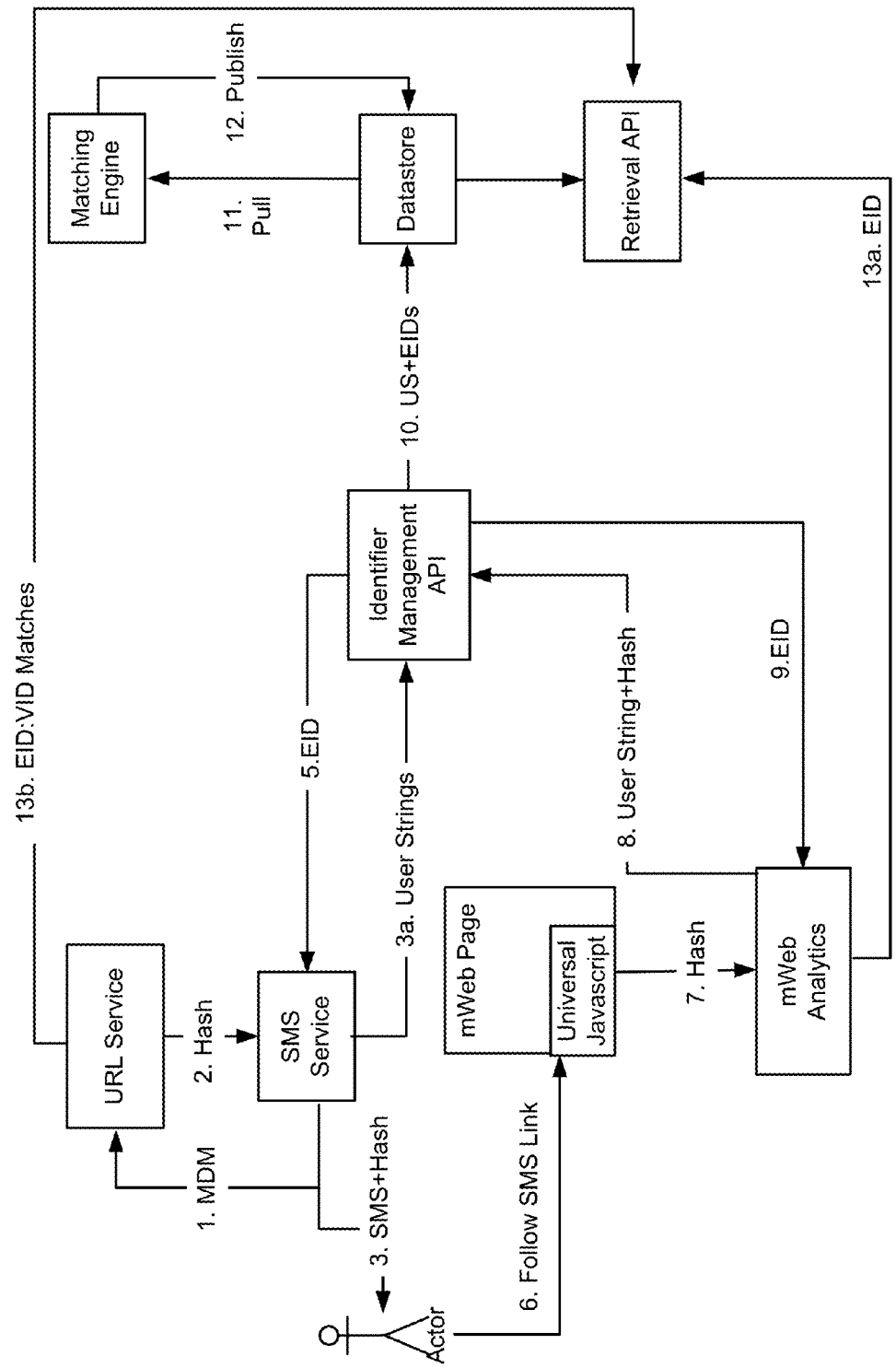
FIG. 5 is a schematic diagram of a compact URL service for encoding in accordance with an illustrative embodiment of the invention.

FIG. 5 shows the use of a compact URL service to encode a user's MSIDN in to a landing page URL, embedded in an SMS message sent to that user. When the user executes the embedded URL in the received SMS or MMS message, the compact URL will request the service convert the tiny URL into the full landing page Internet address and redirect their browser to the mobile page. That page is associated with the original SMS message. Alternatively, in the case of Email messaging, a user email address could be used instead of the MSIDN phone number.

MDM software may enable transmission (1) of SMS information to a URL service from a mobile device. An SMS service may receive (2) a hash related to a URL from the URL service and may transmit (3) an SMS+hash to the mobile device. Related user strings may also be transmitted (3a) from the SMS service to an identifier management API. An EID may be transmitted (5) from the identifier management API to the SMS service. The user may click a link related to the SMS+hash and data may be transmitted (6) to a mobile web page system enabled with universal JavaScript. The mobile webpage system may transmit (7) a related hash to a mobile web analytics system, which may transmit (8) a user string+ hash to the identifier management API. The identifier management API may transmit (9) an EID to mobile web analytics system and may transmit (10) a US+EID to a datastore.

A matching engine may pull (11) related data from the datastore and may publish (12) further related data to the datastore, which may pass the data to a retrieval API. The retrieval API may also receive (13a) an EID from the mobile web analytics system and receive (13(b)) an EID:VID match from the URL service.

Lastly, the hashed user identifier for that marketing suite channel is then accessible to the universal end to end user tracking JavaScript in the page for extraction and storage in the local database. That database now contains the marketing suite channel user identifier, correlated with the stored VID and all other channels that user has accessed. Those correlations are logged to the server user end to end tracking application as well, for federation with additional data products and 3rd party supplied data such as various targeting categories.

Tracking Application Installs from Other Applications and Mobile Web

Figure 6:
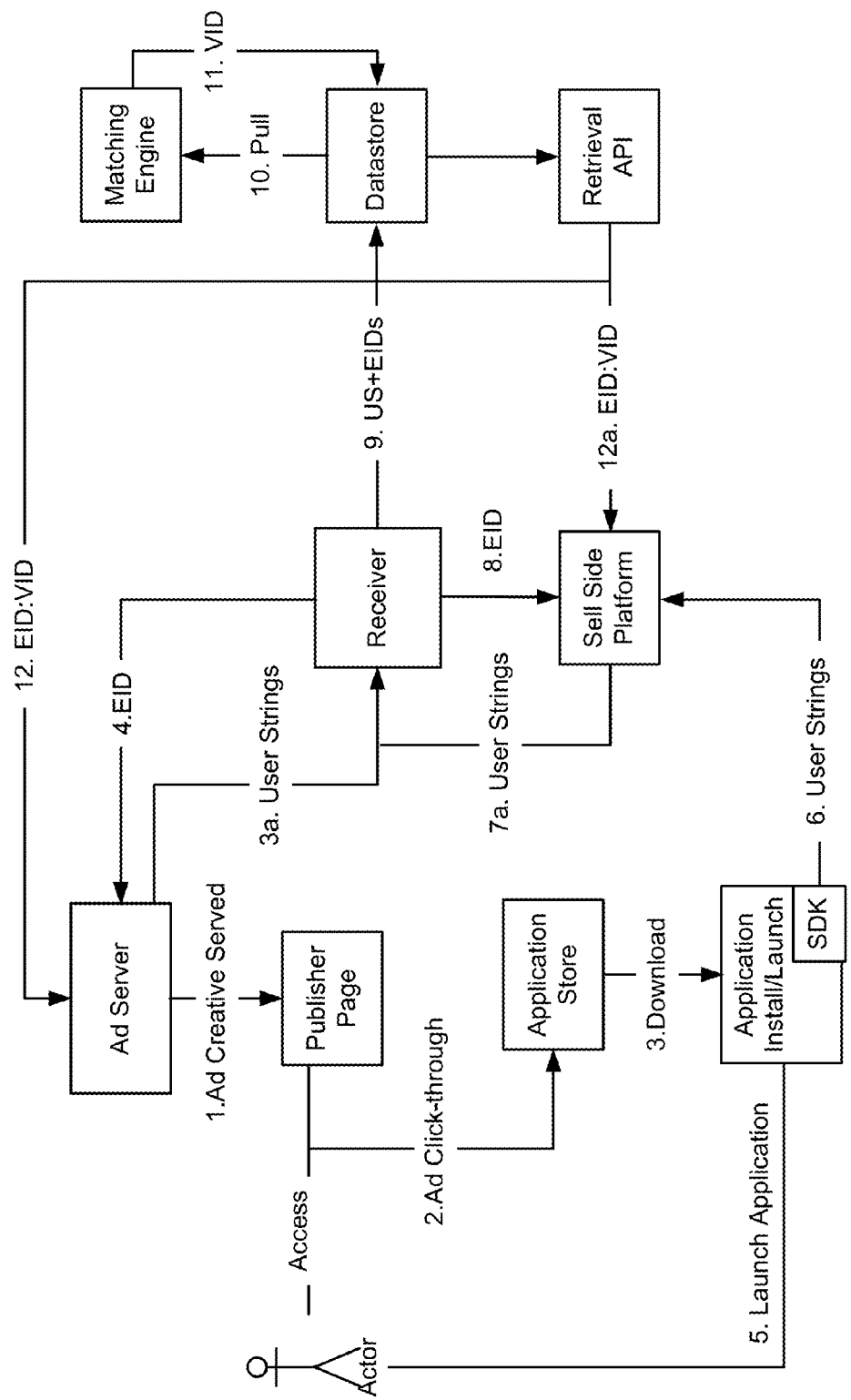
FIG. 6 is a schematic diagram of an application tracking system accordance with an illustrative embodiment of the invention.

FIG. 6 is a system of an exemplary implementation of EID and VID mapping based for tracking application installations initiated from an installed application or the device browser. An ad creative may be served (1) from an ad server to a publisher page. A user (actor) may access the ad creative through an ad click-through (2) from the publisher page, which may communicate to an application store from which an application is available. Related user strings may be passed (3*a*) to a receiver. The application may be downloaded (3) to the mobile device and installed or launched (5) at the mobile device, which may be enabled by an SDK and/or directed by the user. Related user strings may also be passed (6) to a sell side platform and then on to the receiver.

An EID may be passed (8) from the receiver to the sell side platform and US+EIDs may be passed (9) to a datastore from the receiver. A matching engine may pull (10) data from the datastore and the datastore may receive (11) a VID from the matching engine. A retrieval API may receive data and/or the VID from the datastore and an EID:VID may be passed (12*a*) to the sell side platform and/or passed (12) to the ad server. In this way, the system may track application installations initiated from an installed application or the device browser.

Tracking Campaigns Delivered Across Multiple Devices

Using the technique presented in the previous section, short codes embedded in traditional media can be used to track campaigns delivered across multiple devices. The user sends a short code and keyword embedded in radio, television, computer video, outdoor billboards or printed on packaged goods from their mobile device SMS application. The return of a response message with a compact URL to an associated landing page can track them as they navigate from traditional media consumed on another device to the mobile web, as explained previously.

Figure 7A:
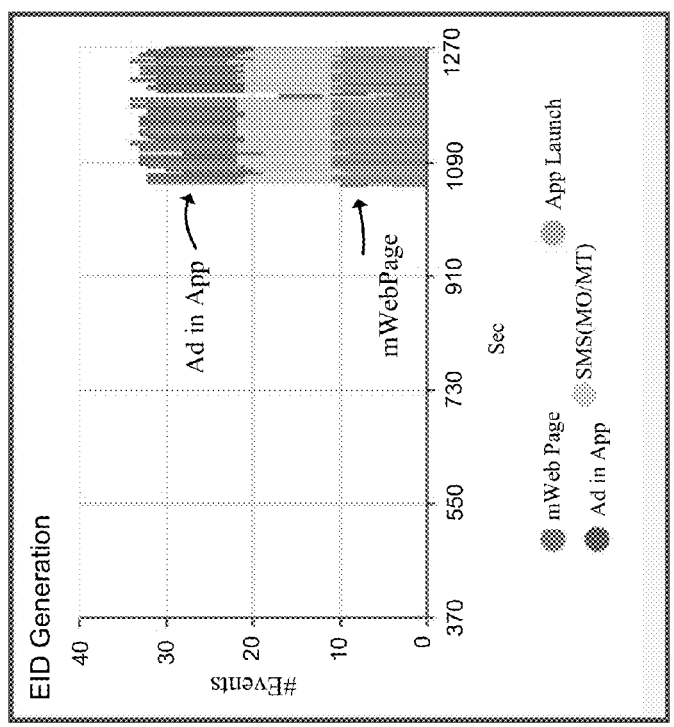

FIGS. 7A-7F provide exemplary reports showing a representative example of tracking a user through the previously described marketing channels in real time. FIG. 7A shows a graph of the performance of the EID generation service along with the incoming source information as part of a user interface. The unique user ID for each specific marketing communications channel is recorded in the device resident HTML 5 database and transmitted to the server user tracking application only the first time the user accesses each channel.

Figure 7B:
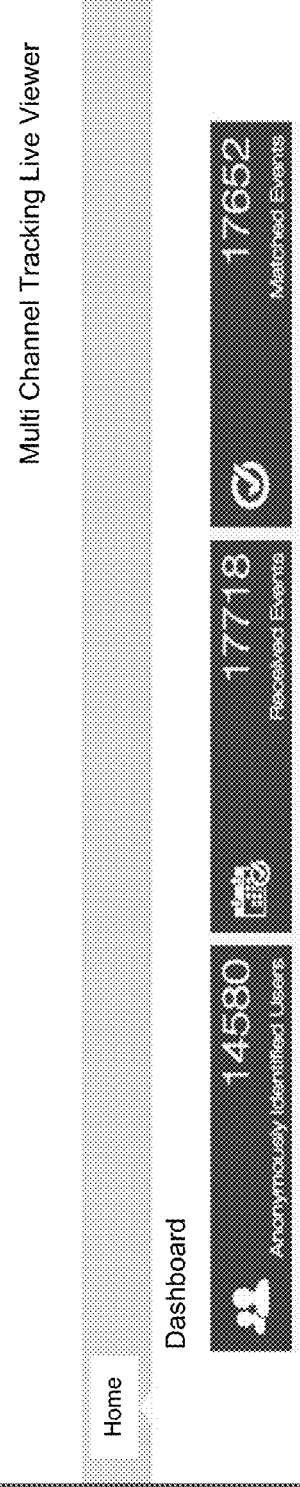
Figures 7C, 7D:
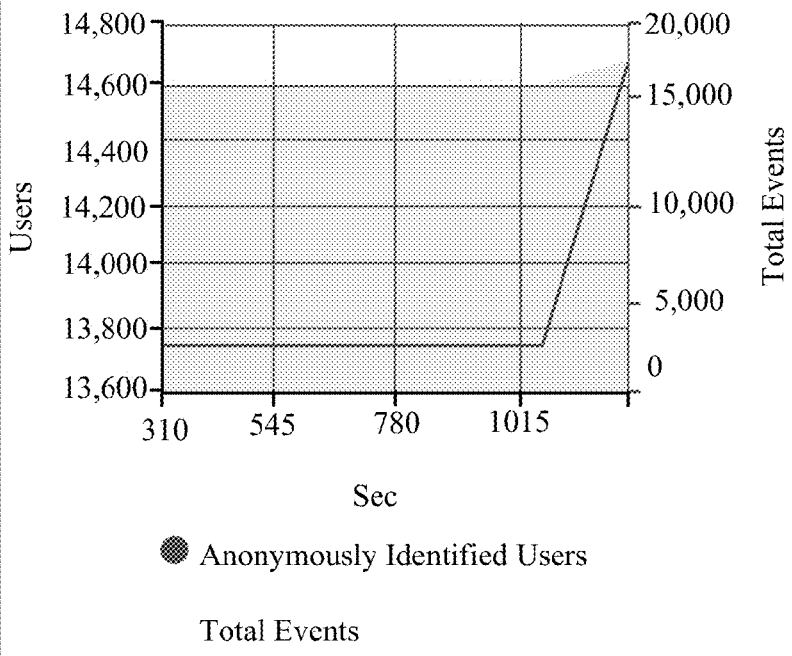

FIG. 7B shows a user interface configured to aggregate information that shows the total amount of anonymously identified users, the total amount of received user events and the matched events (VID assignments). FIG. 7C shows a user interface that includes a Multi Channel Tracking coverage chart shows how many of the uniquely identified users can cover any of the channels where tracking is applied. The more users identified in >2 channels the more universal the information we have about the profile of the user.

Figure 7E:
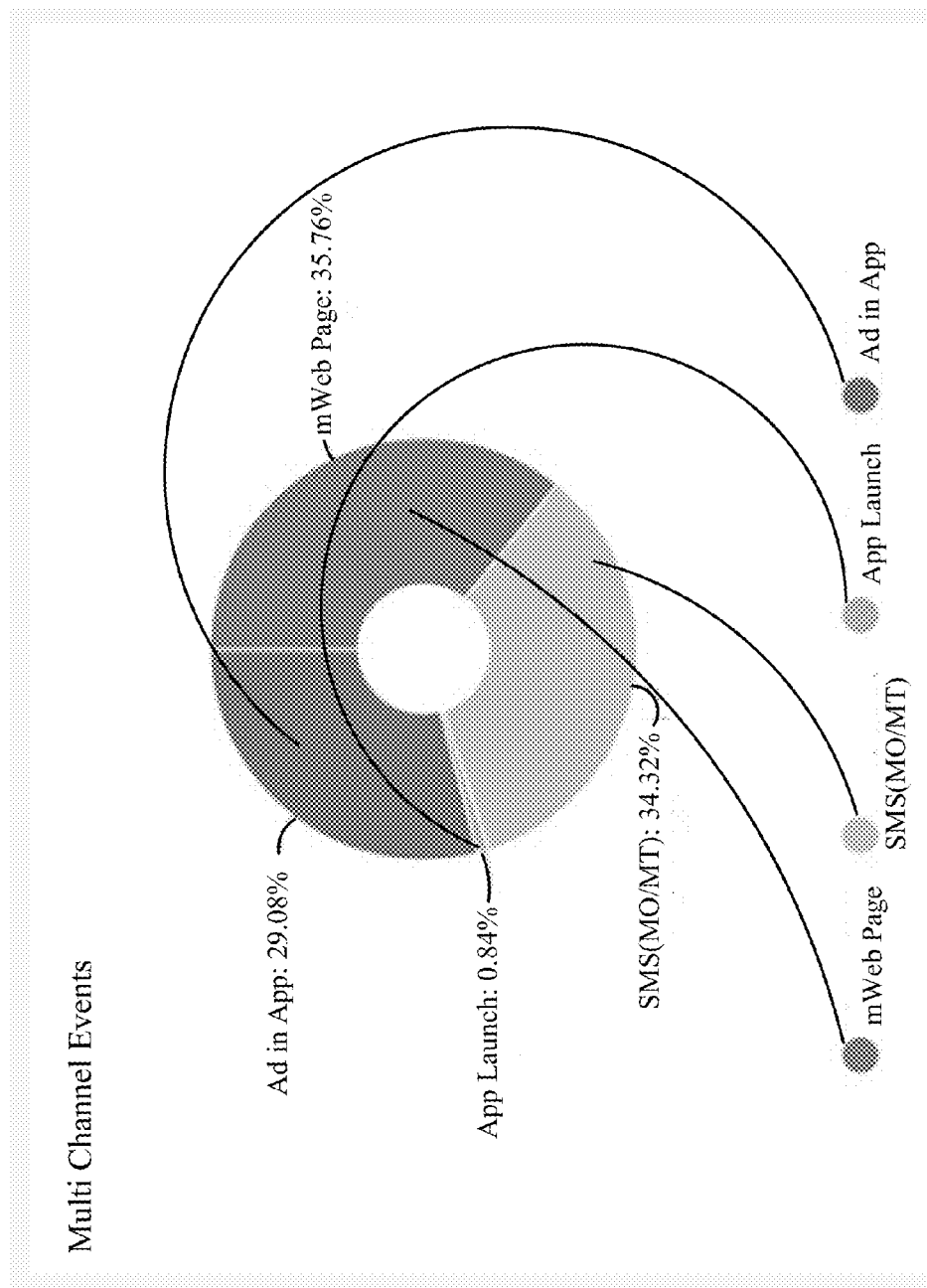

FIG. 7D is a user interface that shows identified users vs. marketing channel interaction events. That is a ratio to understand how the newly incoming events contribute to identify new users. FIG. 7E is a user interface that shows multi Channel tracking event distribution per marketing and advertising communication channel. FIG. 7F is a user interface of a substantially real time table or a real time table that shows the incoming event types, the time-stamp of occurrence that is used by the approximation matching methods along with the matching method applied.

It is expected there will be cases where deterministic correlation of users across some marketing channels cannot be performed in the device, e.g., feature phones that do not enable JavaScript or the conversion path is such that does not allow capturing of attributes that can be deterministically matched. In this and other similar cases correlation of channel content requests against existing user profiles can be performed using an approximation approach. This section describes the approach to that.

This solution uses the global unique user identifier to identify user interactions. All the attributes from user events captured during the interaction may include the MSISDN (hashed), browser type, along with location information, internet address or other identifiers that can be parsed during the interaction. Attributes can be assigned a hash number to ensure PII is not stored, and is mapped into distinct groups. The collected attributes contribute in the development of unique user profiles. One of the methods used to achieve that is through hierarchical clustering.

Collected attribute tuples form clusters that represent unique user entities. The method iteratively calculates a similarity score across clusters and merges the ones that exceed the specified threshold. The process ends when there are no additional clusters to be merged. The resulting clusters are assigned a VID. The latter universal identifiers update the tuples in corresponding product stores and are also supplied to the universal tracking component to allow within device matching in future user events.

There are cases that EID corresponds to attributes that can be matched deterministically. In that case the matching EIDs are assigned an anonymous universal identifier (VID). As described above there are cases that VIDs can be assigned through hierarchical clustering. Other approximation techniques wrapped into the implementation of the non-deterministic matching instance include probabilistic matching. Probabilistic matching is used usually as an offline process, given its average time to complete, as an alternative method that leverages probability theory in the reasoning for user attributes correlation.

In one embodiment Bayesian Networks can be used to identify user matching cases. In the case of Bayesian Networks we represent the predicting attributes in the form of an acyclic directed graph. The edges in a Bayesian graph represent the dependent relation between attributes represented in vertices. Therefore the resulting network describes the probability distribution of the variables based on the dependency assumptions included in the model. The latter allows the definition of Conditional Probability Tables that give a probability for a match given a set of conditions defined by the formulated network. One implementation considers as matches the one with the higher probability above the threshold.

Figure 8A:
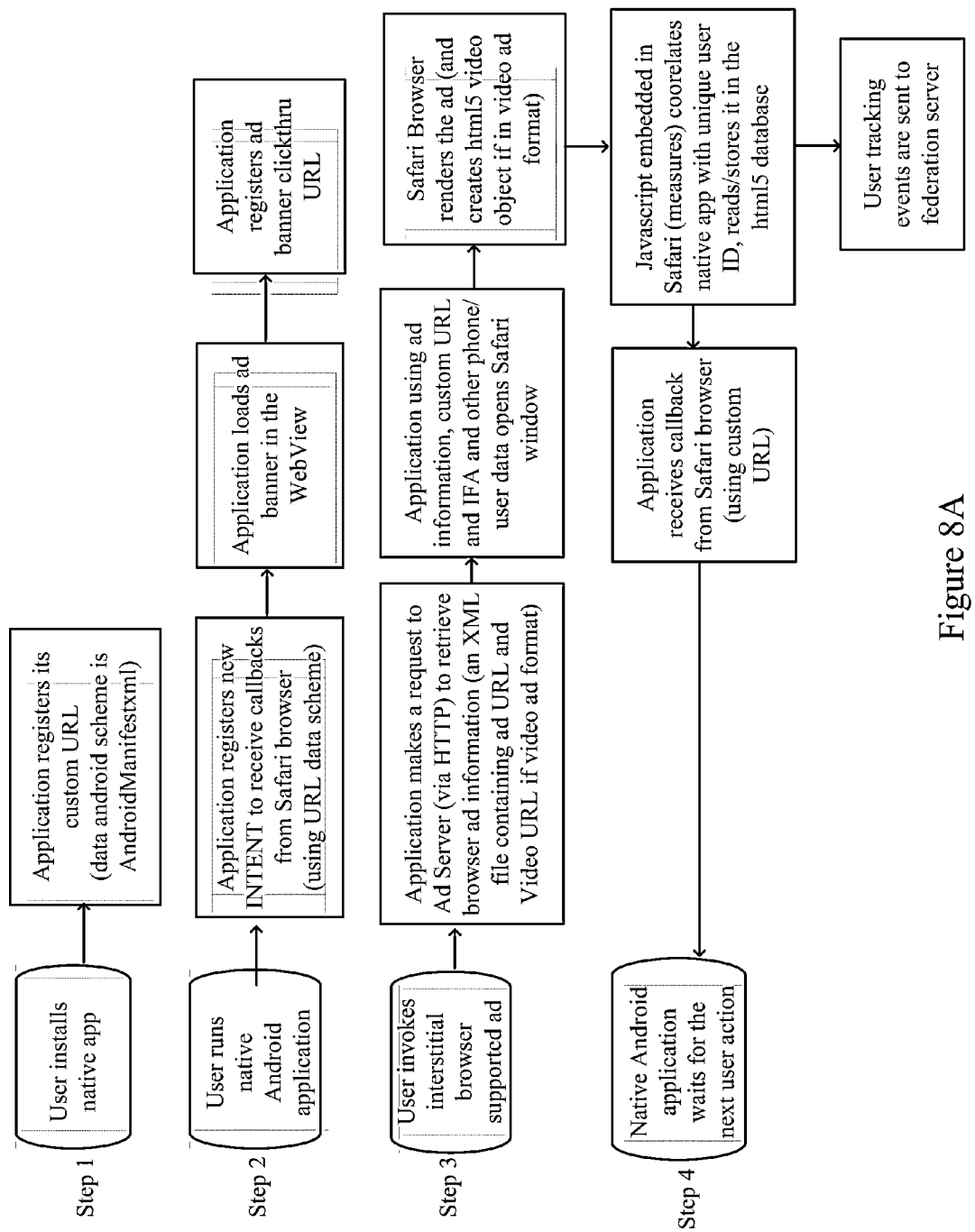
FIG. 8A is a schematic diagram of an implementation in accordance with an illustrative embodiment of the invention.
Figure 8B:
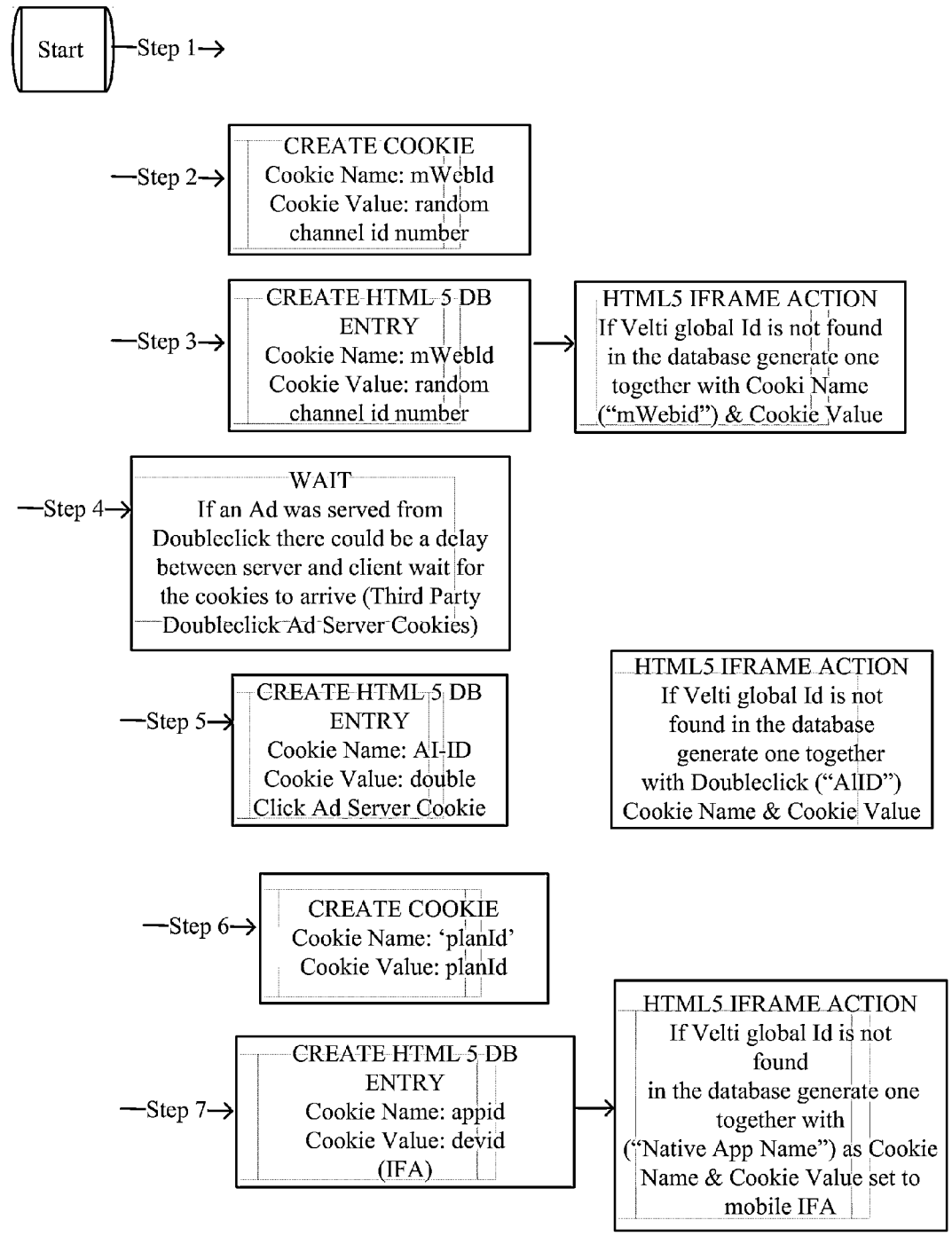
FIG. 8B is also schematic diagram of an implementation in accordance with an illustrative embodiment of the invention.
Figure 8C:
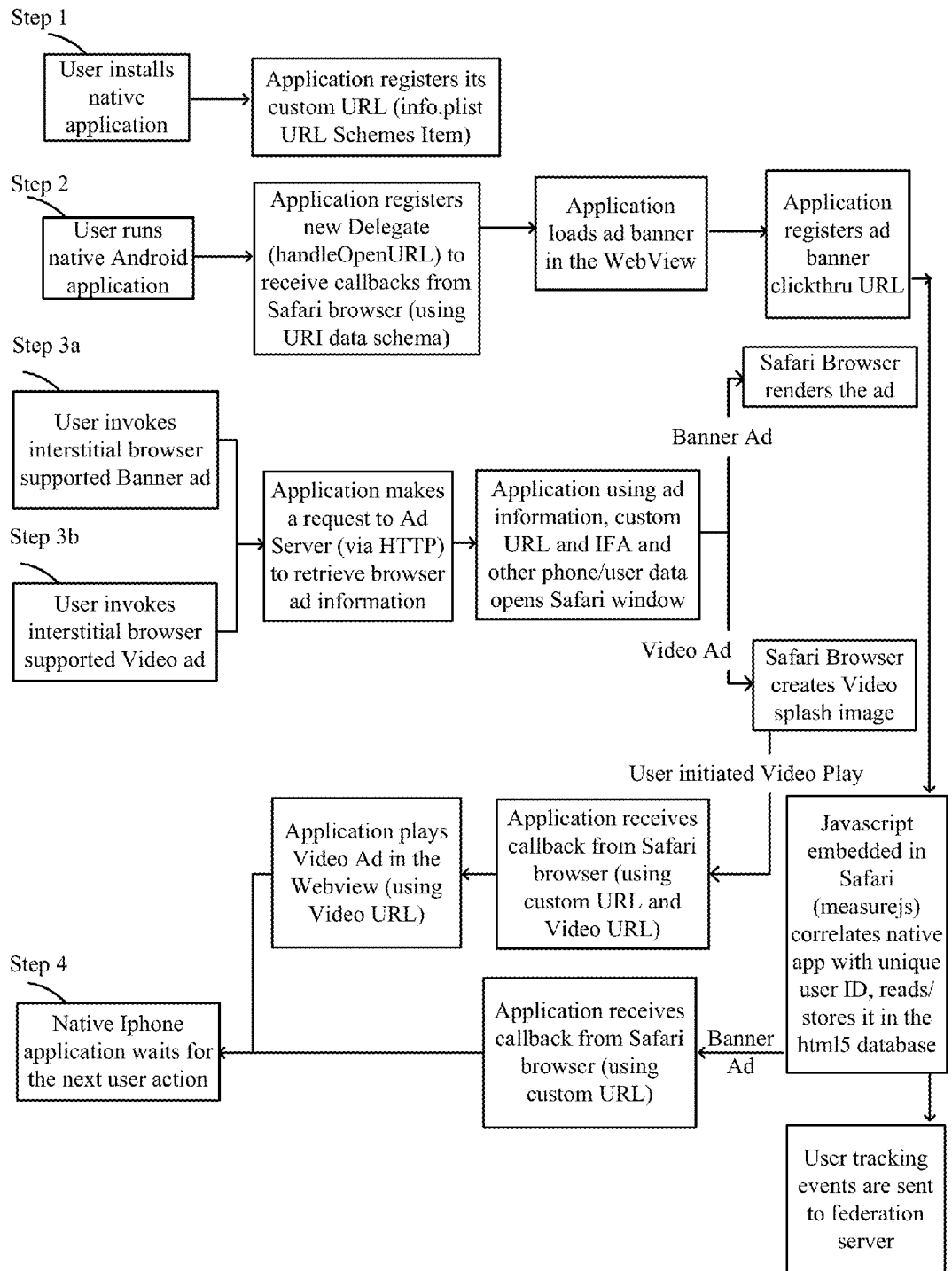
FIG. 8C is also schematic diagram of an implementation in accordance with an illustrative embodiment of the invention.

FIG. 8A describes a system embodiment and related method steps that allows mobile smart device native applications to invoke a browser display, which when completed returns to the application. A custom URL is passed to an embedded script running in the browser content. The custom URL is passed in the query string of the content URL and is unique to each application on each device. It is captured as that channel user identifier and correlated to the Universal User ID in the HTML 5 local database. User tracking in the context of the Android operating system is shown in the workflow diagram of FIG. 8A. Related cookie and HTML 5 implementation are described in FIG. 8B and related method steps. A user tracking approach for a native iPhone application is shown in FIG. 8C.

Universal Cross Channel User Tracking Script Work Flow

Figure 8D:
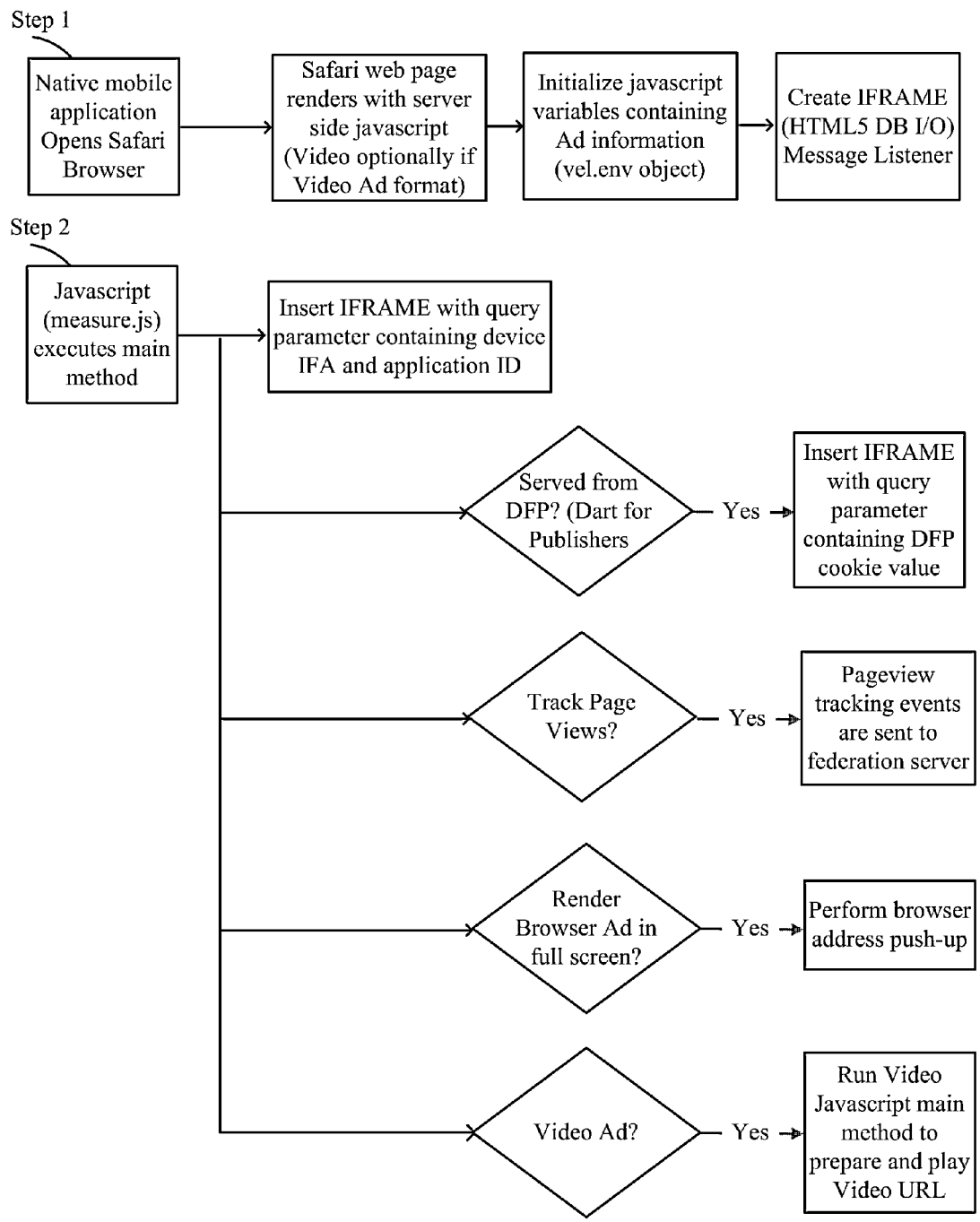
FIGS. 8D and 8E are a schematic diagram of universal JavaScript implementation in accordance with an illustrative embodiment of the invention.
Figure 8E:
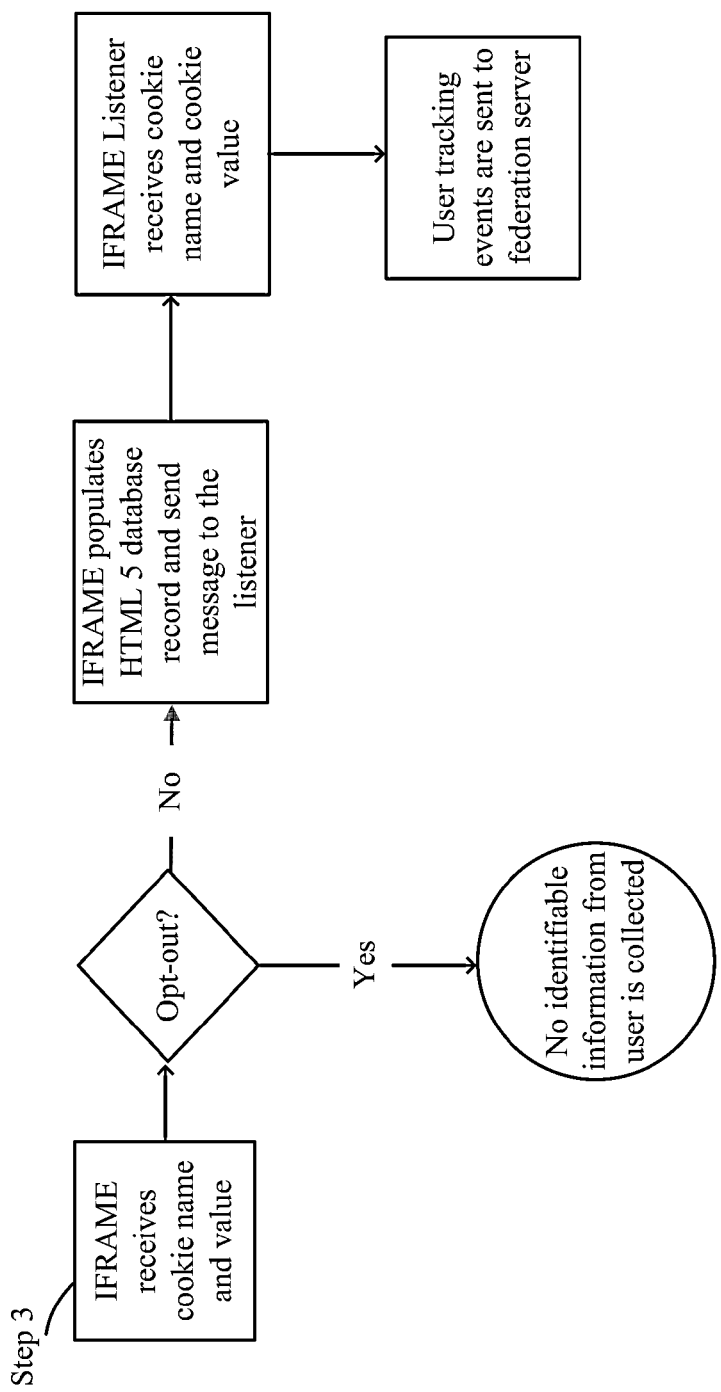

FIGS. 8D and 8E describe the universal JavaScript implementation that allows capturing individual channel user identifiers and correlates them to a VID in HTML 5 local databases. Various identifiers for advertising IFA are shown in FIGS. 8A-8G.

User Opt Out of Tracking Work Flow

Figure 8F:
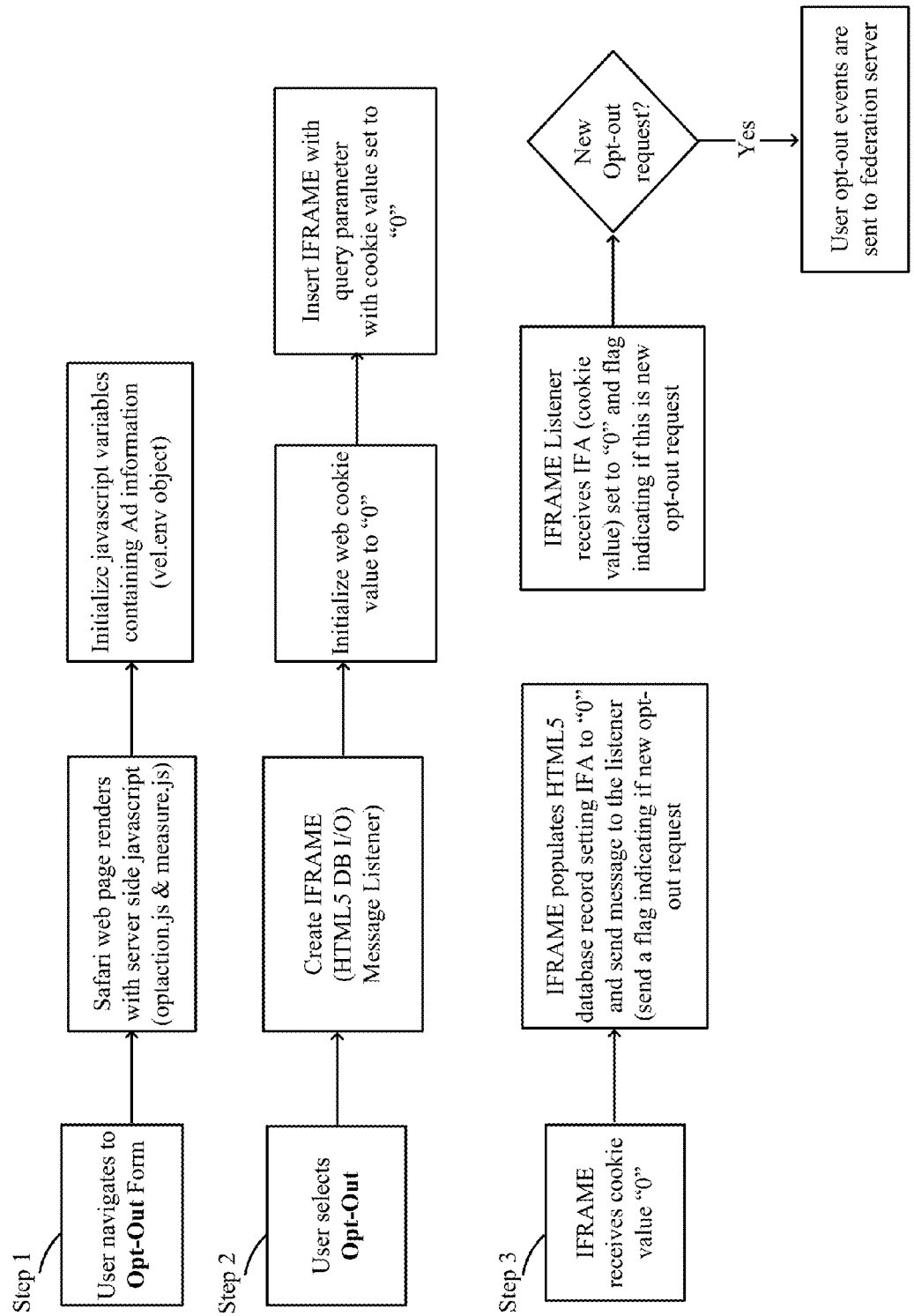
FIG. 8F is an exemplary opt out workflow allowing users to opt out of federation server participation in accordance with an illustrative embodiment of the invention.
Figure 8G:
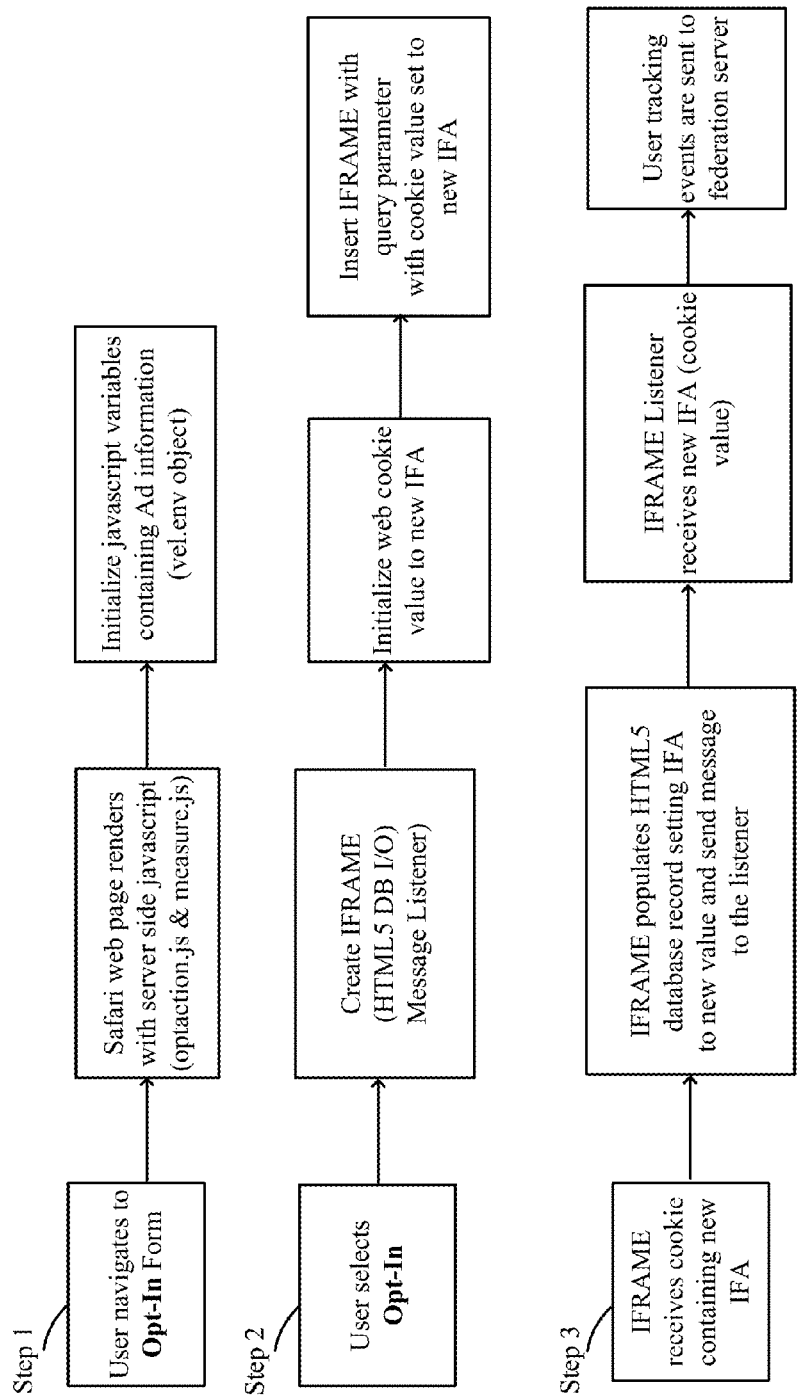
FIG. 8G is an exemplary opt in workflow allowing users to opt into federation server participation in accordance with an illustrative embodiment of the invention.

FIGS. 8F and 8G describe a Universal JavaScript implementation that allows users to opt out and opt back in to tracking.

The computing device may include a server computer, a mobile device, a client user computer, a personal computer (PC), a laptop computer, a tablet PC, a desktop computer, a control system, a microprocessor or any computing device capable of executing a set of instructions (sequential or otherwise) that specify actions to be taken by that computing device. Further, while a single computing device is illustrated, the term "computing device" shall also be taken to include any collection of computing devices that individually or jointly execute a set (or multiple sets) of instructions to perform any one or more of the software features or methods disclosed herein. The computing device can includes machine readable medium or other memory that includes one or more software modules for displaying a graphical user interface such as a user tracking reporting interface or other interface described herein.

In the preceding embodiments described herein, a mobile device or an end user device include, without limitation, mobile phones, smart phones, iPads, Android-based devices, tablets, personal digital assistants, hand-held computers, ultra-mobile personal computers, notebooks, laptop computers and the like. The systems described herein can include one or more computers or servers that contain and/or run the application, and a visual display for viewing a graphic user interface. Devices, computers, and servers preferably include a processing unit or processor, a system memory, a disk storage, a communication interface, an input device, an output device, and a system bus. System bus couples system components including, but not limited to, system memory to processing unit. The processing unit can be any of various available processors. One or more applications can include various data elements and programs suitable for performing process steps, user identifier generation and tracking and correlation across communication channels.

Storage may include removable or fixed, volatile or non-volatile or permanent or re-writable computer storage media. The computer readable medium can be any available medium that can be accessed by a general purpose or special purpose mobile device. By way of example, and not limitation, such a computer readable medium can comprise flash memory, RAM, ROM, electrically erasable programmable read only memory (EEPROM), optical disk storage, magnetic disk storage or other magnetic storage devices, or any other medium that can be used to store digital information on a mobile device.

The computer readable medium embodies a program, functions, and/or instructions that cause a device, computer, or server to operate in a specific and predefined manner as described herein. For example, the messaging, application, and reporting discussed herein can be implemented as software code to be executed using any suitable computer language and may be stored on any of the storage media described above, or can be configured into the logic of device, computer or server. Such software code may be executed using any suitable computer language such as, for example, Java, JavaScript, C++, C, C#, Perl, HTML, Visual Basic, database languages, APIs, various system-level SDKs, assembly, firmware, microcode, and/or other languages and tools.

The present invention may be embodied in many different forms, including, but in no way limited to, computer program logic for use with a processor (e.g., a microprocessor, microcontroller, digital signal processor, or general purpose computer), programmable logic for use with a programmable logic device, (e.g., a Field Programmable Gate Array (FPGA) or other PLD), discrete components, integrated circuitry (e.g., an application Specific Integrated Circuit (ASIC)), or any other means including any combination thereof.

Computer program logic implementing all or part of the functionality previously described herein may be embodied in various forms, including, but in no way limited to, a source code form, a computer executable form, and various intermediate forms (e.g., forms generated by an assembler, compiler, linker, or locator). Source code may include a series of computer program instructions implemented in any of various programming languages (e.g., an object code, an assembly language, or a high-level language such as Fortran, C, C++, JAVA, or HTML) for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

The application may be fixed in any form (e.g., source code form, computer executable form, or an intermediate form) either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCMCIA card), or other memory device. For example, a computer program product may reside on a computer readable storage medium having a plurality of instructions stored thereon, which, when executed by a processor, cause the processor to perform operations discussed herein. The application may be fixed in any form in a signal that is transmittable to a computer using any of various communication technologies, including, but in no way limited to, analog technologies, digital technologies, optical technologies, wireless technologies (e.g., Bluetooth), networking technologies, and internetworking technologies. The application may be distributed in any form as a removable storage medium with accompanying printed or electronic documentation (e.g., shrink-wrapped software), preloaded with a computer system (e.g., on system ROM or fixed disk), or distributed from a server or electronic bulletin board over the communication system (e.g., the Internet or World Wide Web).

Hardware logic (including programmable logic for use with a programmable logic device) implementing all or part of the functionality previously described herein may be designed using traditional manual methods, or may be designed, captured, simulated, or documented electronically using various tools, such as Computer Aided Design (CAD), a hardware description language (e.g., VHDL or AHDL), or a PLD programming language (e.g., PALASM, ABEL, or CUPL).

Programmable logic may be fixed either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), or other memory device. The programmable logic may be fixed in a signal that is transmittable to a computer using any of various communication technologies, including, but in no way limited to, analog technologies, digital technologies, optical technologies, wireless technologies (e.g., Bluetooth), networking technologies, and internetworking technologies. The programmable logic may be distributed as a removable storage medium with accompanying printed or electronic documentation (e.g., shrink-wrapped software), preloaded with a computer system (e.g., on system ROM or fixed disk), or distributed from a server or electronic bulletin board over the communication system (e.g., the Internet or World Wide Web).

As used herein a module refers to software, hardware, or firmware suitable for performing a specific data processing or data transmission task. Typically, in a preferred embodiment a module refers to a software routine, program, or other memory resident application suitable for receiving, transforming, routing and processing instructions, or various cookies, scripts, client side tracking identifiers, non-universal identifiers, universal identifiers, federating and user matching data, and other information of interest.

Devices and systems described herein may include operatively associated computer-readable media such as memory for storing software applications used in obtaining, processing, storing and/or communicating data. It can be appreciated that such memory can be internal, external, remote or local with respect to its operatively associated computer or computer system.

Memory may also include any means for storing software or other instructions including, for example and without limitation, a hard disk, an optical disk, floppy disk, DVD (digital versatile disc), CD (compact disc), memory stick, flash memory, ROM (read only memory), RAM (random access memory), DRAM (dynamic random access memory), PROM (programmable ROM), EEPROM (extended erasable PROM), and/or other like computer-readable media.

In general, computer-readable memory media applied in association with embodiments of the invention described herein may include any memory medium capable of storing instructions executed by a programmable apparatus. Where applicable, method steps described herein may be embodied or executed as instructions stored on a computer-readable memory medium or memory media. These instructions may be software embodied in various programming languages such as C++, C, Java, and/or a variety of other kinds of software programming languages that may be applied to create instructions in accordance with embodiments of the invention.

The aspects, embodiments, features, and examples of the invention are to be considered illustrative in all respects and are not intended to limit the invention, the scope of which is defined only by the claims. Other embodiments, modifications, and usages will be apparent to those skilled in the art without departing from the spirit and scope of the claimed invention.

The aspects, embodiments, features, and examples of the invention are to be considered illustrative in all respects and are not intended to limit the invention, the scope of which is defined only by the claims. Other embodiments, modifications, and usages will be apparent to those skilled in the art without departing from the spirit and scope of the claimed invention.

The use of headings and sections in the application is not meant to limit the invention; each section can apply to any aspect, embodiment, or feature of the invention.

Throughout the application, where compositions are described as having, including, or comprising specific components, or where processes are described as having, including or comprising specific process steps, it is contemplated that compositions of the present teachings also consist essentially of, or include, the recited components, and that the processes of the present teachings also consist essentially of, or include, the recited process steps.

In the application, where an element or component is said to be included in and/or selected from a list of recited elements or components, it should be understood that the element or component can be any one of the recited elements or components and can be selected from a group consisting of two or more of the recited elements or components. Further, it should be understood that elements and/or features of a composition, an apparatus, or a method described herein can be combined in a variety of ways without departing from the spirit and scope of the present teachings, whether explicit or implicit herein.

The use of the terms "include," "includes," "including," "have," "has," or "having" should be generally understood as open-ended and non-limiting unless specifically stated otherwise.

The use of the singular herein includes the plural (and vice versa) unless specifically stated otherwise. Moreover, the singular forms "a," "an," and "the" include plural forms unless the context clearly dictates otherwise. In addition, where the use of the term "about" is before a quantitative value, the present teachings also include the specific quantitative value itself, unless specifically stated otherwise.

It should be understood that the order of steps or order for performing certain actions is immaterial so long as the present teachings remain operable. Moreover, two or more steps or actions may be conducted simultaneously.

Where a range or list of values is provided, each intervening value between the upper and lower limits of that range or list of values is individually contemplated and is encompassed within the invention as if each value were specifically enumerated herein. In addition, smaller ranges between and including the upper and lower limits of a given range are contemplated and encompassed within the invention. The listing of exemplary values or ranges is not a disclaimer of other values or ranges between and including the upper and lower limits of a given range.

The examples presented herein are intended to illustrate potential and specific implementations of the invention. It can be appreciated that the examples are intended primarily for purposes of illustration of the invention for those skilled in the art. There may be variations to these diagrams or the operations described herein without departing from the spirit of the invention. For instance, in certain cases, method steps or operations may be performed or executed in differing order, or operations may be added, deleted or modified.

Furthermore, whereas particular embodiments of the invention have been described herein for the purpose of illustrating the invention and not for the purpose of limiting the same, it will be appreciated by those of ordinary skill in the art that numerous variations of the details, materials and arrangement of elements, steps, structures, and/or parts may be made within the principle and scope of the invention without departing from the invention as described in the claims.

What is claimed is:

1. A computer-based method of tracking a user across a plurality of communication channels comprising:
   generating a first non-universal user identifier associated with a first communication channel in response to a first action of a mobile device;
   generating a second non-universal user identifier associated with a second communication channel in response to a second action of the mobile device;

storing the first non-universal user identifier and the second non-universal user identifier in a data repository;

correlating, using an application installed on the mobile device, the stored first non-universal user identifier and the stored second non-universal user identifier with a universal identifier having an associated user profile;

associating the universal identifier with a plurality of actions performed with the mobile device such that the associated user profile comprises a mapping between the universal identifier and activities performed by the user across the plurality of communication channels such that a user can be tracked, wherein the user profile is generated using approximation methods including clustering and probabilistic matching using a plurality of mobile device channel specific identifiers, wherein the mobile device channel specific identifiers are selected from the group consisting of a first party cookie, a third party cookie, and a plurality of product identifiers; and directing ads to a user identified by the universal identifier, wherein the first communication channel and the second communication channel are communication channels of an advertising campaign.

2. The computer-based method of claim 1 further comprising generating a third non-universal user identifier associated with a third communication channel in response to a third action of the mobile device.

3. The computer-based method of claim 2 wherein the first, second, and third communication channels are selected from the group consisting of receiving text messages, receiving emails, viewing a video, viewing a webpage, viewing a video ad, viewing a webpage ad, interacting with social applications, and downloading an application.

4. The computer-based method of claim 1 wherein associating the universal identifier with a plurality of actions is performed using a computing device running a Bayesian network to perform probabilistic user matching.

5. The computer-based method of claim 1 further comprising comparing one or more user profiles to incoming request profiles using a probabilistic Bayesian network running on computing device.

6. A computer-based system of tracking a user across a plurality of communication channels comprising:

one or more receivers, executing on a computing device, the one or more receivers configured to collect information from the plurality of communication channels;

a user ID generator configured to provide non-universal user identifiers that can be matched to a universal user identifier;

a data repository comprising a plurality of non-universal user identifiers, each non-universal user identifier associated with one communication channel of the plurality of communication channels, wherein the plurality of non-universal user identifiers are selected from the group consisting of a first party cookie, a third party cookie, and a plurality of product identifiers, wherein a first communication channel and a second communication channel of the plurality of communication channels are communication channels of an advertising campaign; and a federation server configured to receive user actions associated with the first and the second communication channels from a mobile device client application, generate a universal identifier using the received user actions and the plurality of non-universal user identifiers, associate a user profile with the universal identifier using approximation methods including clustering and probabilistic matching using a plurality of mobile device channel specific identifiers, and associate the universal identifier with a plurality of actions performed with the mobile device such that the associated user profile comprises a mapping between the universal identifier and activities performed by the user across a plurality of communication channels such that a user can be tracked, wherein the mobile device channel specific identifiers are selected from the group consisting of a first party cookie, a third party cookie, and a plurality of product identifiers.

7. The system of claim 6 further comprising a compact uniform resource locator (URL) software module configured to compact a mobile web URL accessed by the mobile device and generate a non-universal user identifier associated with the compacted mobile URL.

8. The system of claim 6 wherein the communication channels are selected from the group consisting of receiving text messages, receiving emails, viewing a video, viewing a webpage, viewing a video ad, viewing a webpage ad, and downloading an application.

9. The system of claim 6 further comprising a privacy software module configured to enable the user to opt out of being tracked using a universal identifier.

10. The system of claim 6 further comprising a privacy software module.

11. A computer program product residing on a non-transitory computer readable storage medium having a plurality of instructions stored thereon, which, when executed by a processor, cause the processor to perform operations for tracking a user across a plurality of communication channels, the operations comprising:

generating a first non-universal user identifier associated with a first communication channel in response to a first action of a mobile device;

generating a second non-universal user identifier associated with a second communication channel in response to a second action of the mobile device;

storing the first non-universal user identifier and the second non-universal user identifier in a data repository;

correlating, using an application installed on the mobile device, the stored first nonuniversal user identifier and the stored second non-universal user identifier with a universal identifier having an associated user profile;

associating the universal identifier with a plurality of actions performed with the mobile device such that the associated user profile comprises a mapping between the universal identifier and activities performed by the user across the plurality of communication channels such that a user can be tracked, wherein the user profile is generated using approximation methods including clustering and probabilistic matching using a plurality of mobile device channel specific identifiers; and directing ads to the user identified by the universal identifier, wherein the first communication channel and the second communication channel are communication channels of an advertising campaign.

12. The computer program product of claim 11, wherein the operations further comprise generating a third non-universal user identifier associated with a third communication channel in response to a third action of the mobile device.

13. The computer program product of claim 12 wherein the first, second, and third communication channels are selected from the group consisting of receiving text messages, receiving emails, viewing a video, viewing a webpage, viewing a video ad, viewing a webpage ad, interacting with social applications, and downloading an application.

14. The computer program product of claim 11 wherein the mobile device channel specific identifiers are selected from the group consisting of a first party cookie, a third party cookie, and a plurality of product identifiers.

15. The computer program product of claim 11 wherein associating the universal identifier with a plurality of actions is performed using a computing device running a Bayesian network to perform probabilistic user matching.

16. The computer program product of claim 11 wherein the operations further comprise comparing one or more user profiles to incoming request profiles using a probabilistic Bayesian network running on a computing device.

17. A computer-based method of tracking a user across a plurality of communication channels comprising:
 generating a first non-universal user identifier associated with a first communication channel in response to a first action of a mobile device;
 generating a second non-universal user identifier associated with a second communication channel in response to a second action of the mobile device;
 storing the first non-universal user identifier and the second non-universal user identifier in a data repository;
 correlating the stored first non-universal user identifier and the stored second non-universal user identifier with a universal identifier having an associated user profile;
 associating the universal identifier with a plurality of actions performed with the mobile device such that the associated user profile comprises a mapping between the universal identifier and activities performed by the user across the plurality of communication channels such that the user can be tracked, wherein associating the universal identifier with a plurality of actions is performed using a computing device running a Bayesian network to perform probabilistic user matching; and
 directing ads to the user identified by the universal identifier, wherein the first communication channel and the second communication channel are communication channels of an advertising campaign.

18. The system of claim 6 wherein the federation server is further configured to:
 direct ads to a user identified by the universal identifier, wherein the first communication channel and the second communication channel are communication channels of an advertising campaign; and
 evaluate the ads to determine which of the ads has highest activity level by the universal identifier.

19. A computer-based method of tracking a user across a plurality of communication channels comprising:
 generating a first non-universal user identifier associated with a first communication channel in response to a first action of a mobile device;
 generating a second non-universal user identifier associated with a second communication channel in response to a second action of the mobile device;
 storing the first non-universal user identifier and the second non-universal user identifier in a data repository;
 correlating the stored first non-universal user identifier and the stored second non-universal user identifier with a universal identifier having an associated user profile;
 associating the universal identifier with a plurality of actions performed with the mobile device such that the associated user profile comprises a mapping between the universal identifier and activities performed by the user across the plurality of communication channels such that a user can be tracked, wherein the user profile is generated using approximation methods including clustering and probabilistic matching using a plurality of mobile device channel specific identifier; and
 directing ads to a user identified by the universal identifier, wherein the first communication channel and the second communication channel are communication channels of an advertising campaign.

20. The method of claim 19 further comprising, receiving user actions with a federation server from a mobile client application, before correlating the stored first non-universal user identifier and the stored second non-universal user identifier with a universal identifier having an associated user profile, wherein the user actions comprise actions associated with the first and the second communication channel; and
 generating the universal identifier with the federation server before correlating the stored first non-universal user identifier and the stored second non-universal user identifier with a universal identifier having an associated user profile.

* * * * *